(12) United States Patent
Ihara et al.

(10) Patent No.: US 8,298,709 B2
(45) Date of Patent: Oct. 30, 2012

(54) SECONDARY BATTERY

(75) Inventors: Masayuki Ihara, Fukushima (JP);
Hiroyuki Yamaguchi, Fukushima (JP);
Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 702 days.

(21) Appl. No.: 12/401,190

(22) Filed: Mar. 10, 2009

(65) Prior Publication Data

US 2009/0226821 A1    Sep. 10, 2009

(30) Foreign Application Priority Data

Mar. 10, 2008   (JP) ................................ 2008-059498

(51) Int. Cl.
*H01M 6/16*         (2006.01)
(52) U.S. Cl. ........ 429/341; 429/343; 429/199; 429/200; 429/330; 429/339; 429/340; 429/218.1
(58) Field of Classification Search .................. 429/341, 429/343, 199, 200, 330, 339, 340, 218.1
See application file for complete search history.

(56) References Cited

FOREIGN PATENT DOCUMENTS

| | | |
|---|---|---|
| JP | 1997-190819 | 7/1997 |
| JP | 1997-190820 | 7/1997 |
| JP | 2000-12079 | 1/2000 |
| JP | 2004-335379 | 11/2004 |
| JP | 2005-11594 | 1/2005 |
| JP | 2006-134684 | 5/2006 |
| JP | 2006-351242 | 12/2006 |

*Primary Examiner* — Laura Weiner
(74) *Attorney, Agent, or Firm* — K&L Gates LLP

(57) ABSTRACT

A secondary battery capable of improving the cycle characteristics while securing the initial charge and discharge characteristics is provided. The secondary battery includes a cathode, an anode, and an electrolytic solution. The anode has an anode active material layer containing a plurality of anode active material particles having silicon (Si). The anode active material layer contains at least one of an oxide-containing film covering a surface of the anode active material particles and a metal material not being alloyed with an electrode reactant provided in a gap in the anode active material layer. The electrolytic solution contains a solvent containing an organic acid that has a portion including an electron attractive group such as —(O=)C—C(=O)— bond in the center and a hydroxyl group on the both ends.

16 Claims, 7 Drawing Sheets

SECONDARY BATTERY

CROSS REFERENCES TO RELATED APPLICATIONS

The present application claims priority to Japanese Patent Application JP 2008-059498 filed in the Japanese Patent Office on Mar. 10, 2008, the entire contents of which is being incorporated herein by reference.

BACKGROUND

The present application relates to a secondary battery including an anode having an anode active material layer.

In recent years, portable electronic devices such as combination cameras (videotape recorder), mobile phones, and notebook personal computers have been widely used, and it is strongly demanded to reduce their size and weight and to achieve their long life. Accordingly, as a power source of the portable electronic devices, a battery, in particular a light-weight secondary batter capable of providing a high energy density has been developed.

Specially, a secondary battery using insertion and extraction of lithium for charge and discharge reaction (so-called lithium ion secondary battery) is extremely prospective, since such a secondary battery is able to provide a higher energy density compared to a lead battery and a nickel cadmium battery. The lithium ion secondary battery has a cathode, an anode, and an electrolytic solution. The cathode has a cathode active material layer on a cathode current collector. The anode has an anode active material layer on an anode current collector.

For a composition of the electrolytic solution used for the lithium secondary batteries, to improve the battery characteristics such as cycle characteristics, technologies using various organic acids have been proposed. As the organic acid, formic acid, acetic acid, oxalic acid, malonic acid, maleic acid, fumaric acid, benzoic acid and the like have been used (for example, as described in Japanese Unexamined Patent Application Publication Nos. 2000-012079 and 2006-351242).

For the foregoing organic acids, a technique using the organic acid for a cathode, an anode and the like in addition to the technique using the organic acid for the electrolytic solution. As the organic acid, oxalic acid, succinic acid, malonic acid, adipic acid, sebacic acid, phosphoric acid and the like have been used, and the metal salts thereof have been also used (for example, as described in Japanese Unexamined Patent Application Publication Nos. 09-190819, 09-190820, 2004-335379, 2005-011594, and 2006-134584).

SUMMARY

In these years, the high performance and the multi functions of the portable electronic devices are increasingly developed, and the electric power consumption tends to be increased. Accordingly, charge and discharge of the secondary battery are frequently repeated, and thus the cycle characteristics tend to be easily lowered. Accordingly, further improvement of the cycle characteristics of the secondary battery has been aspired. In this case, to obtain superior cycle characteristics, it is important to secure the initial charge and discharge characteristics.

In view of the foregoing, in the application, it is desirable to provide a secondary battery capable of improving the cycle characteristics while securing the initial charge and discharge characteristics.

According to an embodiment, there is provided a secondary battery including a cathode, an anode, and an electrolytic solution. The anode has an anode active material layer containing a plurality of anode active material particles having silicon. The anode active material layer contains at least one of an oxide-containing film covering a surface of the anode active material particles and a metal material not being alloyed with an electrode reactant provided in a gap in the anode active material layer. The electrolytic solution contains a solvent containing at least one of organic acids shown in Chemical formula 1.

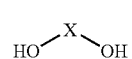

Chemical formula 1

In the formula, X is $-(O=)C-(C(R1)_2)_a-C(=O)-$, $-(R2)_2C-(C(R1)_2)_b-C(=O)-$, $-(O=)_2S-(C(R3)_2)_c-S(=O)_2-$, $-(R4)_2C-(C(R3)_2)_d-S(=O)_2-$, or $-(O=)C-(C(R5)_2)_e-S(=O)_2-$. R1 to R5 are a hydrogen group, an alkyl group, an aryl group, a halogen group, an alkyl halide group, or an aryl halide group. a to e are integer numbers 0 to 4.

According to the secondary battery of the embodiment, the anode active material layer of the anode contains the plurality of anode active material particles having silicon, and contains at least one of the oxide-containing film covering the surface of the anode active material particles and the metal material not being alloyed with the electrode reactant provided in a gap in the anode active material layer. Further, the solvent of the electrolytic solution contains at least one of the organic acids shown in Chemical formula 1. In this case, compared to a case that the anode active material layer does not contain the oxide-containing film and the metal material, expansion and shrinkage of the anode active material layer in charge and discharge are prevented, and decomposition of the electrolytic solution is prevented. Further, compared to a case that the electrolytic solution does not contain the organic acid shown in Chemical formula 1, the chemical stability of the electrolytic solution is improved and thus decomposition reaction of the electrolytic solution in charge and discharge is prevented. Therefore, the cycle characteristics are able to be improved while the initial charge and discharge characteristics are secured.

DETAILED DESCRIPTION

The present application will be described in detail below with reference to the drawings according to an embodiment.

First Embodiment

Figure 1:
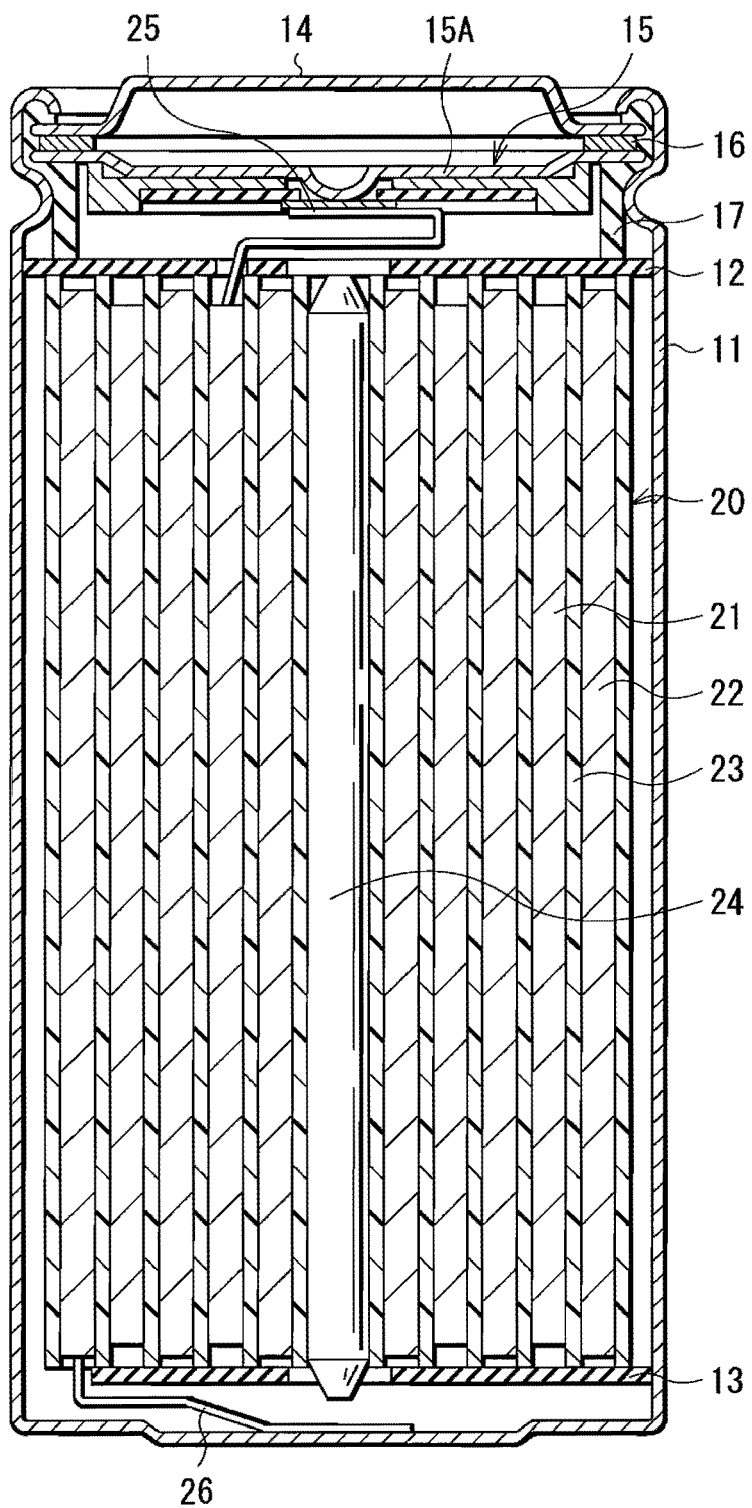
FIG. 1 is a cross sectional view illustrating a structure of a secondary battery according to a first embodiment.
Figure 2:
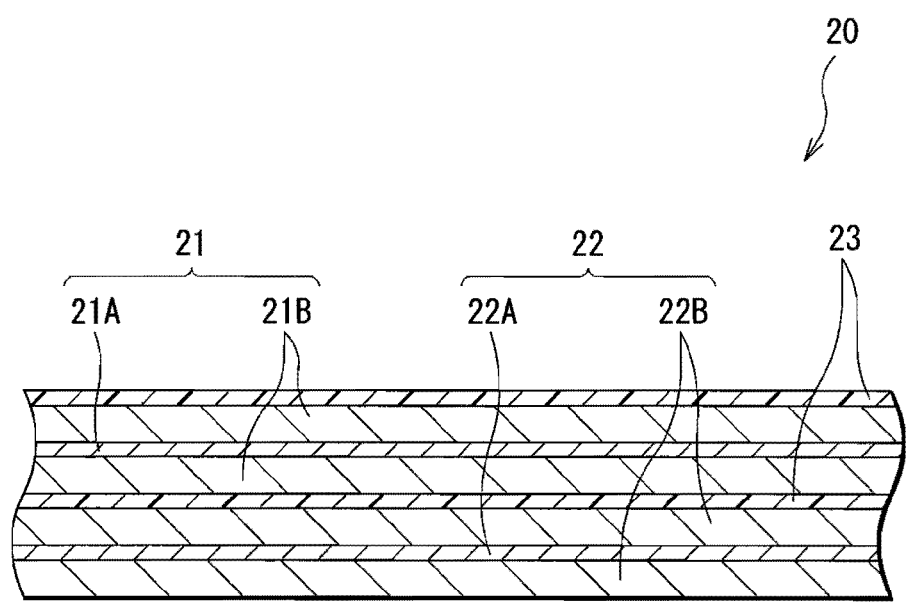
FIG. 2 is a cross sectional view illustrating an enlarged part of the spirally wound electrode body shown in FIG. 1.

FIG. 1 and FIG. 2 illustrate a cross sectional structure of a secondary battery according to a first embodiment of the application. FIG. 2 illustrates an enlarged part of a spirally wound electrode body 20 shown in FIG. 1. The secondary battery herein described is a lithium ion secondary battery in which, for example, the capacity of an anode 22 is expressed based on insertion and extraction of lithium as an electrode reactant.

The secondary battery mainly contains the spirally wound electrode body 20 in which a cathode 21 and the anode 22 are layered and spirally wound with a separator 23 in between, and a pair of insulating plates 12 and 13 inside a battery can 11 in the shape of an approximately hollow cylinder. The battery structure using the cylindrical battery can 11 is a so-called cylindrical type.

The battery can 11 has, for example, a hollow structure in which one end thereof is closed and the other end thereof is opened, and is made of a metal material such as iron, aluminum, and an alloy thereof. In the case where the battery can 11 is made of iron, for example, plating by nickel or the like may be provided. The pair of insulating plates 12 and 13 is arranged to sandwich the spirally wound electrode body 20 in between from above and below and to extend perpendicularly to the spirally wound periphery face.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is thereby hermetically sealed. The battery cover 14 is made of, for example, a metal material similar to that of the battery can 11. The safety valve mechanism 15 is electrically connected to the battery cover 14 with the PTC device 16 in between. In the safety valve mechanism 15, in the case where the internal pressure of the battery becomes a certain level or more by internal short circuit, external heating or the like, a disk plate 15A flips to cut the electric connection between the battery cover 14 and the spirally wound electrode body 20. As temperature rises, the PTC device 16 increases the resistance and thereby limits a current to prevent abnormal heat generation resulting from a large current. The gasket 17 is made of, for example, an insulating material and its surface is coated with asphalt.

A center pin 24 may be inserted in the center of the spirally wound electrode body 20. In the spirally wound electrode body 20, a cathode lead 25 made of a metal material such as aluminum is connected to the cathode 21, and an anode lead 26 made of a metal material such as nickel is connected to the anode 22. The cathode lead 25 is electrically connected to the battery cover 14 by being welded to the safety valve mechanism 15. The anode lead 26 is electrically connected to the battery can 11 by being welded to the battery can 11.

The cathode 21 has a structure in which, for example, a cathode active material layer 21B is provided on the both faces of a cathode current collector 21A having a pair of faces. However, the cathode active material layer 21B may be provided on only a single face of the cathode current collector 21A.

The cathode current collector 21A is made of, for example, a metal material such as aluminum, nickel, and stainless.

The cathode active material layer 21B contains, as a cathode active material, one or more cathode materials capable of inserting and extracting lithium.

As the cathode material capable of inserting and extracting lithium, for example, a lithium-containing compound is preferable, since thereby a high energy density is able to be obtained. As the lithium-containing compound, for example, a complex oxide containing lithium and a transition metal element, a phosphate compound containing lithium and a transition metal element and the like are included. Specially, a compound containing at least one selected from the group consisting of cobalt, nickel, manganese, and iron as a transition metal element is preferable, since thereby a higher voltage is able to be obtained. The chemical formula thereof is expressed by, for example, $Li_xM1O_2$ or $Li_yM2PO_4$. In the formula, M1 and M2 represent one or more transition metal elements. Values of x and y vary according to the charge and discharge state, and are generally in the range of $0.05 \leq x \leq 1.10$ and $0.05 \leq y \leq 1.10$.

As the complex oxide containing lithium and a transition metal element, for example, a lithium cobalt complex oxide ($Li_xCoO_2$), a lithium nickel complex oxide ($Li_xNiO_2$), a lithium nickel cobalt complex oxide ($Li_xNi_{1-z}CO_zO_2$ (z<1)), a lithium nickel cobalt manganese complex oxide ($Li_xNi_{(1-v-w)}CO_vMn_wO_2$) (v+w<1)), lithium manganese complex oxide having a spinel structure ($LiMn_2O_4$) and the like are included. Specially, a complex oxide containing cobalt is preferable, since thereby a high capacity is obtained and superior cycle characteristics are obtained. Further, as the phosphate compound containing lithium and a transition metal element, for example, lithium iron phosphate compound ($LiFePO_4$) or a lithium iron manganese phosphate compound ($LiFe_{1-u}Mn_uPO_4$ (u<1)) and the like are included.

In addition, as the cathode material capable of inserting and extracting lithium, for example, an oxide such as titanium oxide, vanadium oxide, and manganese dioxide; a disulfide such as titanium disulfide and molybdenum sulfide; a chalcogenide such as niobium selenide; sulfur; a conductive polymer such as polyaniline and polythiophene are included.

It is needless to say that the cathode material capable of inserting and extracting lithium may be a material other than the foregoing compounds. Further, the two or more of the foregoing cathode materials may be used by mixture voluntarily.

If necessary, the cathode active material layer 21B may contain other material such as a cathode binder and a cathode electrical conductor together with the foregoing cathode active material.

As the cathode binder, for example, a synthetic rubber such as styrene-butadiene rubber, fluorinated rubber, and ethylene propylene diene; or a polymer material such as polyvinylidene fluoride are included. One thereof may be used singly, or a plurality thereof may be used by mixture.

As the cathode electrical conductor, for example, a carbon material such as graphite, carbon black, acetylene black, and Ketjen black is included. Such a carbon material may be used singly, or a plurality thereof may be used by mixture. The cathode electrical conductor may be a metal material, a conductive polymer molecule or the like as long as the material has the electric conductivity.

The anode 22 has a structure in which, for example, an anode active material layer 22B is provided on the both faces of an anode current collector 22A having a pair of opposed faces. However, the anode active material layer 22B may be provided on only a single face of the anode current collector 22A.

The anode current collector 22A is made of, for example, a metal material such as copper, nickel, and stainless. The surface of the anode current collector 22A is preferably roughened. Thereby, due to so-called anchor effect, contact characteristics between the anode current collector 22A and the anode active material layer 22B are improved. In this case, it is enough that in at least a region of the surface of the anode current collector 22A that is opposed to the anode active material layer 22B is roughened. As a roughening method, for example, a method of forming fine particles by electrolytic treatment and the like are included. The electrolytic treatment is a method for providing unevenness by forming the fine particles on the surface of the anode current collector 22A by electrolytic method in an electrolytic bath. A copper foil formed by using the electrolytic method is generally called "electrolytic copper foil."

The anode active material layer 22B contains, as an anode active material, one or more anode materials capable of inserting and extracting lithium. The capacity chargeable in the anode material capable of inserting and extracting lithium is preferably larger than the discharge capacity of the cathode 21.

As the anode material capable of inserting and extracting lithium, a material that is capable of inserting and extracting lithium and has at least one of metal elements and metalloid elements as an element is included, since a high energy density is thereby obtained. Such an anode material may be a simple substance, an alloy, or a compound of a metal element or a metalloid element, or may have one or more phases thereof at least in part. In the application, "alloys" include an alloy containing one or more metal elements and one or more metalloid elements, in addition to an alloy composed of two or more metal elements. Further, "alloy" in the application may contain a nonmetallic element. The structure thereof includes a solid solution, a eutectic crystal (eutectic mixture), an intermetallic compound, and a structure in which two or more thereof coexist.

As the foregoing metal element or the foregoing metalloid element, a metal element or a metalloid element capable of forming an alloy with lithium is included. Specifically, magnesium, boron (B), aluminum, gallium (Ga), indium (In), silicon, germanium (Ge), tin, lead (Pb), bismuth (Bi), cadmium (Cd), silver (Ag), zinc, hafnium (Hf), zirconium (Zr), yttrium (Y), palladium (Pd), platinum (Pt) and the like are included. Specially, at least one of silicon and tin is preferable, and silicon is more preferable. Silicon has the high ability to insert and extract lithium, and provides a high energy density.

As an anode material containing at least one of silicon and tin as an element, for example, the simple substance, an alloy, or a compound of silicon; the simple substance, an alloy, or a compound of tin; and a material having one or more phases thereof at least in part are included.

As the alloy of silicon, for example, an alloy containing at least one selected from the group consisting of tin, nickel, copper, iron, cobalt, manganese, zinc, indium, silver, titanium, germanium, bismuth, antimony (Sb), and chromium as the second element other than silicon is included. As the compound of silicon, for example, a compound containing oxygen or carbon (C) is included, and may contain the foregoing second element in addition to silicon. Examples of the alloy or the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), $SnO_w$ ($0<w\leq2$), LiSiO and the like.

As the alloy of tin, for example, an alloy containing at least one selected from the group consisting of silicon, nickel, copper, iron, cobalt, manganese, zinc, indium, silver, titanium, germanium, bismuth, antimony, and chromium as the second element other than tin is included. As a compound of tin, for example, a compound containing oxygen or carbon is included, and may contain the foregoing second element in addition to tin. Examples of the alloy or the compound of tin include $SnSiO_3$, LiSnO, $Mg_2Sn$ and the like.

In particular, as the anode material containing at least one of silicon and tin as an element, for example, an anode material containing a second element and a third element in addition to tin as a first element is preferable. The second element is at least one selected from the group consisting of cobalt, iron, magnesium, titanium, vanadium (V), chromium, manganese, nickel, copper, zinc, gallium, zirconium, niobium (Nb), molybdenum, silver, indium, cerium (Ce), hafnium, tantalum (Ta), tungsten (W), bismuth, and silicon. The third element is at least one selected from the group consisting of boron, carbon, aluminum, and phosphorus (P). In the case where the second element and the third element are contained, the cycle characteristics are improved.

Specially, a SnCoC-containing material that contains tin, cobalt, and carbon as an element, in which the carbon content is in the range from 9.9 wt % to 29.7 wt %, both inclusive, and the cobalt ratio to the total of tin and cobalt (Co/(Sn+Co)) is in the range from 30 wt % to 70 wt %, both inclusive, is preferable. In such a composition range, a high energy density is able to be obtained.

The SnCoC-containing material may further contain other element according to needs. As other element, for example, silicon, iron, nickel, chromium, indium, niobium, germanium, titanium, molybdenum, aluminum, phosphorus, gallium, bismuth or the like is preferable. Two or more thereof may be contained, since thereby higher effect is obtained.

The SnCoC-containing material has a phase containing tin, cobalt, and carbon. Such a phase is preferably a low crystalline phase or an amorphous phase. The phase is a reaction phase capable of being reacted with lithium, and superior cycle characteristics are thereby obtained. The half bandwidth of the diffraction peak obtained by X-ray diffraction of the phase is preferably 1.0 deg or more based on diffraction angle of 2θ in the case where CuKα ray is used as a specific X ray, and the insertion rate is 1 deg/min. Thereby, lithium is more smoothly inserted and extracted, and reactivity with the electrolyte is decreased.

It is easily determined whether or not the diffraction peak obtained by X-ray diffraction of the phase corresponds to the reaction phase capable of being reacted with lithium by comparing an X-ray diffraction chart before the electrochemical reaction with lithium to an X-ray diffraction chart after the electrochemical reaction with lithium. For example, if the diffraction peak position in the X-ray diffraction chart after the electrochemical reaction with lithium is changed from the diffraction peak position in the X-ray diffraction chart before the electrochemical reaction with lithium, the diffraction peak obtained by X-ray diffraction of the phase corresponds to the reaction phase capable of being reacted with lithium. In this case, for example, the diffraction peak of the low crystalline or amorphous reaction phase is shown in the range from 2θ=20 deg to 50 deg. The low crystalline or amorphous reaction phase contains, for example, the foregoing respective elements. It is considered that the low crystalline or amorphous reaction phase is mainly realized by carbon.

The SnCoC-containing material may have a phase containing a simple substance of each element or part thereof, in addition to the low crystalline or the amorphous phase.

In particular, in the SnCoC-containing material, at least part of carbon as an element is preferably bonded with a metal element or a metalloid element as other element. Cohesion or crystallization of tin or the like is thereby prevented.

As a measurement method for examining bonding state of elements, for example, X-ray Photoelectron Spectroscopy (XPS) is included. XPS is a method for examining element composition and element bonding state in the region up to several nm from the sample surface by irradiating the sample surface with soft X ray (in a commercial device, Al—Kα ray or Mg—Kα ray is used) and measuring motion energy of a photoelectron jumping out from the sample surface.

The bound energy of an inner orbit electron of an element is changed correlatively to the charge density on the element in an initial approximate manner. For example, in the case where the charge density of carbon element is decreased by interaction with an element existing in the vicinity thereof, an outer orbit electron such as 2p electron is decreased, and thus 1s electron of carbon element is subject to strong binding force by the orbit. That is, in the case where the charge density of the element is decreased, the bound energy becomes high. In XPS, in the case where the bound energy becomes high, the peak is shifted to a higher energy region.

In XPS, in the case of graphite, the peak of 1s orbit of carbon (C1s) is observed at 284.5 eV in the apparatus in which energy calibration is made so that the peak of 4f orbit of gold atom (Au4f) is obtained in 84.0 eV. In the case of surface contamination carbon, the peak is observed at 284.8 eV. Meanwhile, in the case of higher charge density of carbon element, for example, in the case where carbon is bonded with an element that is more positive than carbon, the peak of C1s is observed in the region lower than 284.5 eV. That is, in the case where at least part of carbon contained in the SnCoC-containing material is bonded with the metal element, the metalloid element or the like as other element, the peak of the composite wave of C1s obtained for the SnCoC-containing material is observed in the region lower than 284.5 eV.

In performing XPS measurement, in the case where the surface is covered with surface contamination carbon, the surface is preferably slightly sputtered by an argon ion gun attached to an XPS device. Further, if the SnCoC-containing material as a measuring target exists in the anode 22, it is preferable that after the secondary battery is disassembled and the anode 22 is taken out, the anode 22 is preferably washed with a volatile solvent such as dimethyl carbonate in order to remove a low volatile solvent and an electrolyte salt existing on the surface of the anode 22. Such sampling is desirably performed under the inactive atmosphere.

Further, in XPS measurement, for example, the peak of C1s is used for correcting the energy axis of spectrums. Since surface contamination carbon generally exists on a material surface, the peak of C1s of the surface contamination carbon is set to in 284.8 eV, which is used as an energy reference. In XPS measurement, the waveform of the peak of C1s is obtained as a form including the peak of the surface contamination carbon and the peak of carbon in the SnCoC-containing material. Therefore, for example, by performing analysis by using commercially available software, the peak of the surface contamination carbon and the peak of carbon in the SnCoC-containing material are separated. In the analysis of the waveform, the position of the main peak existing on the lowest bound energy side is set to the energy reference (284.8 eV).

The SnCoC-containing material is able to be formed by, for example, mixing raw materials of respective elements, dissolving the resultant mixture in an electric furnace, a high frequency induction furnace, an arc melting furnace or the like and then solidifying the resultant. Otherwise, the SnCoC-containing material may be formed by various atomization methods such as gas atomizing and water atomizing; various roll methods; or a method using mechanochemical reaction such as mechanical alloying method and mechanical milling method. Specially, the method using mechanochemical reaction is preferable, since thereby the SnCoC-containing material becomes the low crystalline structure or the amorphous structure. In the method using the mechanochemical reaction, for example, a manufacturing apparatus such as a planetary ball mill apparatus and an attliter is able to be used.

As the raw material, a mixture of simple substances of the respective elements may be used, but an alloy is preferably used for part of elements other then carbon. In the case where carbon is added to the alloy and thereby the material is synthesized by the method using mechanical alloying method, the low crystalline structure or the amorphous structure is obtained and reaction time is shortened as well. The state of the raw material may be powder or a mass.

In addition to the SnCoC-containing material, an SnCoFeC-containing material having tin, cobalt, iron, and carbon as an element is also preferable. The composition of the SnCoFeC-containing material is able to be voluntarily set. For example, as a composition in which the iron content is set small, it is preferable that the carbon content is in the range from 9.9 wt % to 29.7 wt %, both inclusive, the iron content is in the range from 0.3 wt % to 5.9 wt %, both inclusive, and the cobalt ratio to the total of tin and cobalt (Co/(Sn+Co)) is in the range from 30 wt % to 70 wt %, both inclusive. Further, for example, as a composition in which the iron content is set large, it is preferable that the carbon content is in the range from 11.9 wt % to 29.7 wt %, both inclusive, the ratio of the total of cobalt and iron to the total of tin, cobalt, and iron ((Co+Fe)/(Sn+Co+Fe)) is in the range from 26.4 wt % to 48.5 wt %, both inclusive, and the cobalt ratio to the total of cobalt and iron (Co/(Co+Fe)) is in the range from 9.9 wt % to 79.5 wt %, both inclusive. In such a composition range, a high energy density is obtained. The crystallinity of the SnCoFeC-containing material, the measurement method for examining bonding state of elements, the forming method of the SnCoFeC-containing material and the like are similar to those of the foregoing SnCoC-containing material.

The anode active material layer 22B using the simple substance, an alloy, or a compound of silicon; the simple substance, an alloy, or a compound of tin; or a material having one or more phases thereof at least in part as the anode material capable of inserting and extracting lithium is, for example, formed by using vapor-phase deposition method, liquid-phase deposition method, spraying method, coating method, firing method, or a combination of two or more of these methods. In this case, the anode current collector 22A and the anode active material layer 22B are preferably alloyed in at least part of the interface thereof. More specifically, at the interface thereof, the element of the anode current collector 22A may be diffused in the anode active material layer 22B; or the element of the anode active material layer 22B may be diffused in the anode current collector 22A; or these elements may be diffused in each other. Thereby, destruction due to expansion and shrinkage of the anode active material layer 22B in charge and discharge is prevented, and the electron conductivity between the anode current collector 22A and the anode active material layer 22B is improved.

As vapor-phase deposition method, for example, physical deposition method or chemical deposition method are included. Specifically, vacuum evaporation method, sputtering method, ion plating method, laser ablation method, thermal Chemical Vapor Deposition (CVD) method, plasma CVD method and the like are included. As liquid-phase deposition method, a known technique such as electrolytic plating and electroless plating is able to be used. Coating method is a method in which, for example, after a particulate anode active material is mixed with a binder and the like, the resultant mixture is dispersed in a solvent and then coating is provided. Firing method is, for example, a method in which after coating is provided by coating method, heat treatment is provided at temperature higher than the melting point of the binder or the like. For firing method, a known technique such as atmosphere firing method, reactive firing method, and hot press firing method is included as well.

In addition to the foregoing, as the anode material capable of inserting and extracting lithium, for example, a carbon material is included. As the carbon material, for example, graphitizable carbon, non-graphitizable carbon in which the spacing of (002) plane is 0.37 nm or more, or graphite in which the spacing of (002) plane is 0.34 nm or less and the like are included. More specifically, pyrolytic carbon, coke, glassy carbon fiber, an organic polymer compound fired body, activated carbon, carbon black and the like are included. Of the foregoing, the coke includes pitch coke, needle coke, petroleum coke and the like. The organic polymer compound fired body is obtained by firing and carbonizing a phenol resin, a furan resin or the like at appropriate temperature. In the carbon material, the crystal structure change associated with insertion and extraction of lithium is very little. Therefore, a high energy density is thereby obtained and superior cycle characteristics are thereby obtained. In addition, the carbon material also functions as an electrical conductor, and thus the carbon material is preferably used. The shape of the carbon material may be any of a fibrous shape, a spherical shape, a granular shape, and a scale-like shape.

As the anode material capable of inserting and extracting lithium, for example, a metal oxide, a polymer compound and the like capable of inserting and extracting lithium are included. As the metal oxide, for example, iron oxide, ruthenium oxide, molybdenum oxide and the like are included. As the polymer compound, for example, polyacetylene, polyaniline, polypyrrole and the like are included.

It is needless to say that the anode material capable of inserting and extracting lithium may be a material other than the foregoing materials. Further, the two or more of the foregoing series of anode materials may be used by mixture voluntarily.

The foregoing anode active materiel is composed of a plurality of particles. That is, the anode active material layer 22B has a plurality of anode active material particles (hereinafter simply referred to as "anode active material particles"). The anode active material particles are formed by, for example, the foregoing vapor-phase deposition method or the like. However, the anode active material particles may be formed by a method other than vapor-phase deposition method.

In the case where the anode active material particles are formed by deposition method such as vapor-phase deposition method, the anode active material particles may have a single layer structure formed by a single deposition step or may have a multilayer structure formed by a plurality of deposition steps. However, if the anode active material particles are formed by evaporation method associated with high heat in deposition, the anode active material particles preferably have a multilayer structure. In the case where the deposition step of the anode material is divided into several steps (a plurality of thin layers of the anode material are sequentially formed and deposited), time that the anode current collector 22A is exposed at high heat is shortened compared to a case that the deposition is performed in a single deposition step, accordingly the anode current collector 22A is hardly subject to thermal damage.

The anode active material particles are grown, for example, in the thickness direction of the anode active material layer 22B from the surface of the anode current collector 22A. The anode active material particles are preferably linked to the anode current collector 22A at the root thereof, since thereby expansion and shrinkage of the anode active material layer 22B are prevented in charge and discharge. In this case, it is preferable that the anode active material particles are formed by vapor-phase deposition method or the like, and as described above, at least part of the interface with the anode current collector 22A is alloyed. More specifically, at the interface in between, the element of the anode current collector 22A may be diffused in the anode active material particles; or the element of the anode active material particles may be diffused in the anode current collector 22A; or these elements may be diffused in each other.

In particular, the anode active material layer 22B contains at least one of an oxide-containing film covering the surface of the anode active material particles and a metal material not being alloyed with lithium provided in a gap in the anode active material layer 22B, together with the plurality of anode active material particles.

The oxide-containing film covers the surface of the anode active material particles, that is, the surface of the anode active material particles that would be contacted with an electrolytic solution if the oxide-containing film was not provided. In the case where the anode active material layer 22B contains the oxide-containing film, the oxide-containing film functions as a protection film to the electrolytic solution, and decomposition reaction of the electrolytic solution is prevented even if charge and discharge are repeated, resulting in improvement of the cycle characteristics. The oxide-containing film may cover the entire surface of the anode active material particles, or may cover part of the surface of the anode active material particles. Specially, the oxide-containing film preferably covers the entire surface of the anode active material particles, since decomposition reaction of the electrolytic solution is effectively prevented.

The oxide-containing film contains, for example, at least one oxide selected from the group consisting of silicon, germanium, and tin. Specially, the oxide-containing film preferably contains an oxide of silicon. Thereby, the oxide-containing film easily covers over the entire surface of the anode active material particles, and is able to provide superior protective action. It is needless to say that the oxide-containing film may contain an oxide other than the foregoing oxide.

The oxide-containing film is formed by, for example, vapor-phase deposition method or liquid-phase deposition method. Specially, the oxide-containing film is preferably formed by liquid-phase deposition method, since thereby the oxide-containing film easily covers a wide range of the surface of the anode active material particles. As the liquid-phase deposition method, liquid-phase precipitation method, solgel method, coating method, and dip coating method and the like are included. Specially, liquid-phase precipitation method, solgel method, or dip coating method is preferable, and liquid-phase precipitation method is more preferable, since thereby higher effects are obtained. The oxide-containing film may be formed by a single forming method out of the foregoing series of forming methods, or may be formed by two or more forming methods thereof.

In the case where the oxide-containing film is formed by liquid-phase precipitation method, the oxide-containing film is able to be precipitated while the oxide is easily controlled.

The liquid-phase precipitation method is a method in which, for example, a dissolved form easily coordinating fluorine (F) as an anion capture agent is added to a fluoride complex solution of silicon, tin, or germanium and the resultant is mixed, then the anode current collector 22A on which the anode active material layer 22B is formed is dipped in the resultant mixture to make the dissolved form capture fluorine anion generated from the fluoride complex, and thereby an oxide is precipitated on the surface of the anode active material layer 22B to form the oxide-containing film. Instead of the fluoride complex, for example, a silicon compound, a tin compound, or a germanium compound generating other anion such as sulfate ion may be used.

In the case where the oxide-containing film is formed by sol-gel method, a treatment liquid containing fluorine anion or a compound of fluorine and one of Group 13 elements, Group 14 elements, and Group 15 elements in the long period periodic table (specifically, fluorine ion, tetrafluoroboric acid ion, hexafluorophosphate ion and the like) as a reaction accelerator is preferably used. In the oxide-containing film formed by using the treatment liquid, the content of alkoxy group is low. Thus, in the case where the oxide-containing film is used for the anode 22, gas generation amount is decreased.

The thickness of the oxide-containing film is not particularly limited. Specially, the thickness of the oxide-containing film is preferably in the range from 0.1 nm to 500 nm, both inclusive, since thereby the oxide-containing film easily covers a wide range of the surface of the anode active material particles. More specifically, in the case where the thickness of the oxide-containing film is thinner than 0.1 nm, there is a possibility that the oxide-containing film hardly covers a wide range of the surface of the anode active material particles. Meanwhile, in the case where the thickness of the oxide-containing film is thicker than 500 nm, there is a possibility that the formation amount of the oxide-containing film is excessively large, and the energy density is lowered. The thickness of the oxide-containing film is more preferably in the range from 1 nm to 200 nm, both inclusive, much more preferably in the range from 10 nm to 150 nm, both inclusive, and still much more preferably from 20 nm to 100 nm, since thereby higher effects are obtained.

The metal material not being alloyed with lithium (hereinafter simply referred to as "metal material") is provided in a gap in the anode active material layer 22B, that is, in a gap between the anode active material particles or in a gap in the anode active material particles described later. In the case where the anode active material layer 22B contains the metal material, the plurality of anode active material particles are bound to each other with the metal material in between. In addition, in the case where the metal material exists in the foregoing gap, expansion and shrinkage of the anode active material layer 22B are prevented. Accordingly, the cycle characteristics are improved.

The metal material has, for example, a metal element not being alloyed with lithium as an element. As the metal element, for example, at least one selected from the group consisting of iron, cobalt, nickel, zinc, and copper is included. Specially, cobalt is preferable, since thereby the metal material easily intrudes into the foregoing gap, and superior binding action is obtained. It is needless to say that the metal material may contain a metal element other than the foregoing metal elements. However, "metal material" herein is a comprehensive term, including not only a simple substance but also an alloy and a metal compound.

The metal material is formed by, for example, vapor-phase deposition method or liquid-phase deposition method. Specially, the metal material is preferably formed by the liquid-phase deposition method, since thereby the metal material easily intrudes into a gap in the anode active material layer 22B. As the liquid-phase deposition method, for example, electrolytic plating method, electroless plating method or the like is included. Specially, electrolytic plating method is preferable, since thereby the metal material easily intrudes into the foregoing gap, and the formation time thereof is shortened. The metal material may be formed by a single forming method out of the foregoing series of forming methods, or may be formed by two or more forming methods thereof.

As evidenced by the description that "the anode active material layer 22B contains at least one of an oxide-containing film and a metal material," the anode active material layer 22B may have one of the oxide-containing film and the metal material, or may have both thereof. However, to more improve the cycle characteristics, the anode active material layer 22B preferably contains both thereof. Further, in the case where the anode active material layer 22B contains both the oxide-containing film and the metal material, either one thereof may be formed first. However, to more improve the cycle characteristics, the oxide-containing film is preferably formed first.

If necessary, the anode active material layer 22B may contain other material such as an anode binder and an anode electrical conductor together with the foregoing anode active material and the like. Details of the anode binder and the anode electrical conductor are respectively similar to those of the cathode binder and the cathode electrical conductor.

A description will be given in detail of the anode 22 with reference to FIG. 3 to FIG. 6.

Figure 3:
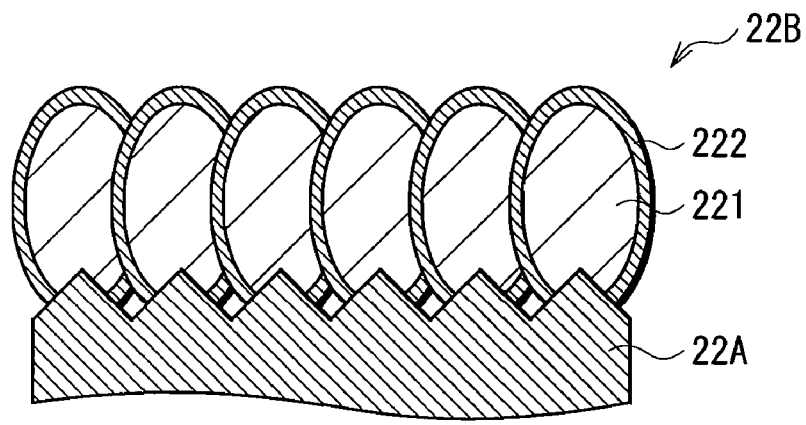
FIG. 3 is a cross sectional view illustrating an enlarged structure of the anode shown in FIG. 2.
Figure 4:
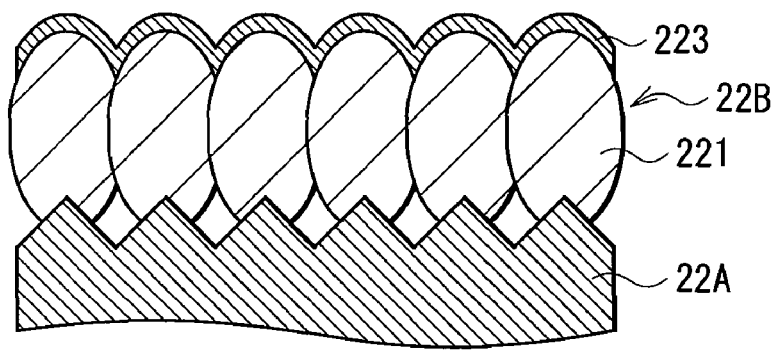
FIG. 4 is a cross sectional view illustrating a structure of an anode of a reference example.

First, a description will be given of a case that the anode active material layer 22B has the oxide-containing film together with the plurality of anode active material particles. FIG. 3 schematically illustrates a cross sectional structure of the anode 22 of the application. FIG. 4 schematically illustrates a cross sectional structure of an anode of a reference example. FIG. 3 and FIG. 4 illustrate a case that the anode active material particles have a single layer structure.

In the anode of the application, as illustrated in FIG. 3, for example, when the anode material is deposited on the anode current collector 22A by vapor-phase deposition method such as evaporation method, a plurality of anode active material particles 221 are formed on the anode current collector 22A. In this case, in the case where the surface of the anode current collector 22A is roughened and a plurality of projection sections (for example, fine particles formed by electrolytic treatment) exist on the surface thereof, the anode active material particles 221 are grown for every projection section described above in the thickness direction. Thus, the plurality of anode active material particles 221 are arranged on the anode current collector 22A, and are linked to the surface of the anode current collector 22A at the root thereof. After that, for example, in the case where an oxide-containing film 222 is formed on the surface of the anode active material particle 221 by liquid-phase deposition method such as liquid-phase precipitation method, the oxide-containing film 222 covers almost entire surface of the anode active material particle 221, in particular, covers a wide range from the apex section to the root of the anode active material particle 221. Such a covering state in the wide range with the oxide-containing film 222 is a characteristic obtained in the case where the oxide-containing film 222 is formed by liquid-phase deposition method. That is, in the case where the oxide-containing film 222 is formed by liquid-phase deposition method, such covering action is applied not only to the apex section of the anode active material particle 221 but also to the root thereof.

Accordingly, the anode active material particle 221 is covered with the oxide-containing film 222 down to the root thereof.

Meanwhile, in the anode of the reference example, as illustrated in FIG. 4, for example, in the case where the plurality of anode active material particles 221 are formed by vapor-phase deposition method and then an oxide-containing film 223 is formed by vapor-phase deposition method similarly, the oxide-containing film 223 covers only the apex section of the anode active material particle 221. Such a small range covered with the oxide-containing film 223 is a characteristic obtained in the case where the oxide-containing film 223 is formed by vapor-phase deposition method. That is, in the case where the oxide-containing film 223 is formed by vapor-phase deposition method, such covering action is applied to the apex section of the anode active material particle 221 but not applied to the root thereof. Accordingly, the anode active material particle 221 is not covered with the oxide-containing film 223 down to the root thereof.

In FIG. 3, the description has been given of a case that the anode active material layer 22B is formed by vapor-phase deposition method. However, in the case where the anode active material layer 22B is formed by other forming method such as coating method and sintering method, an oxide-containing film is similarly formed to cover almost entire surface of the plurality of anode active material particles.

Figure 5:
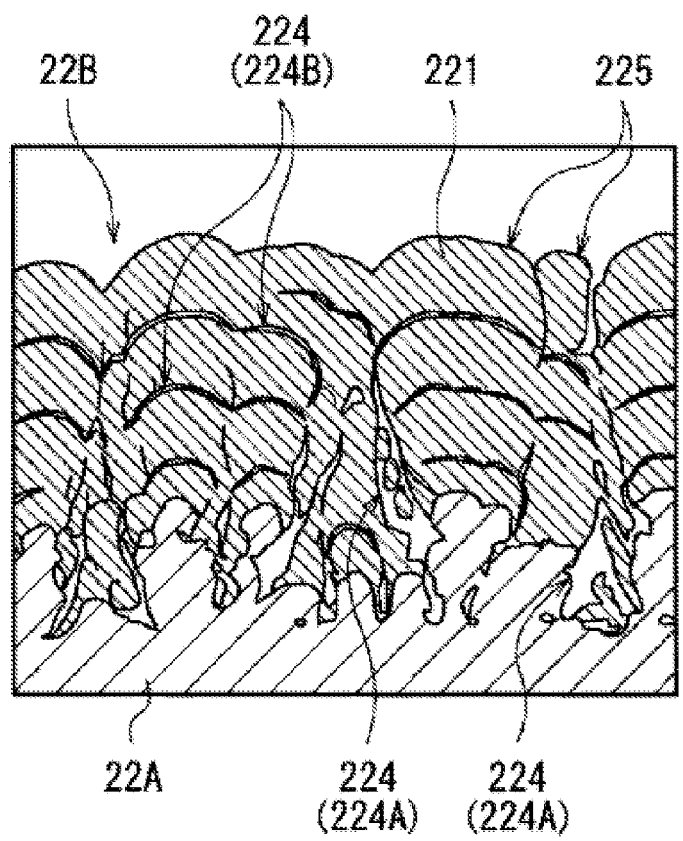
FIG. 5 is a representation of a SEM photograph illustrating a cross sectional structure of the anode shown in FIG. 2 and a schematic view thereof.

Next, a description will be given of a case that the anode active material layer 22B has a metal material not being alloyed with lithium together with the plurality of anode active material particles. FIG. 5 illustrates an enlarged cross sectional structure of the anode 22. FIG. 5 is a schematic drawing of a Scanning Electronic Microscope (SEM). FIG. 5 illustrates a case that the plurality of anode active material particles 221 have a multilayer structure in the particles.

In the case where the anode active material particles 221 have the multilayer structure, a plurality of gaps 224 are generated in the anode active material layer 22B due to the arrangement structure, the multilayer structure, and the surface structure of the plurality of anode active material particles 221. The gap 224 mainly includes two types of gaps 224A and 224B categorized according to the cause of generation. The gap 224A is a gap generated between adjacent anode active material particles 221. Meanwhile, the gap 224B is a gap generated between each layer in the anode active material particles 221.

On the exposed face (outermost surface) of the anode active material particle 221, a void 225 may be generated. As a fibrous minute projection section (not illustrated) is generated on the surface of the anode active material particles 221, the void 225 is generated between the projection sections. The void 225 may be generated entirely over the exposed face of the anode active material particles 221, or may be generated in only part thereof. Since the foregoing fibrous minute projection section is generated on the surface of the anode active material particles 221 every time the anode active material particles 221 are formed, the void 225 may be generated between each layer in addition to on the exposed face of the anode active material particles 221.

Figure 6:
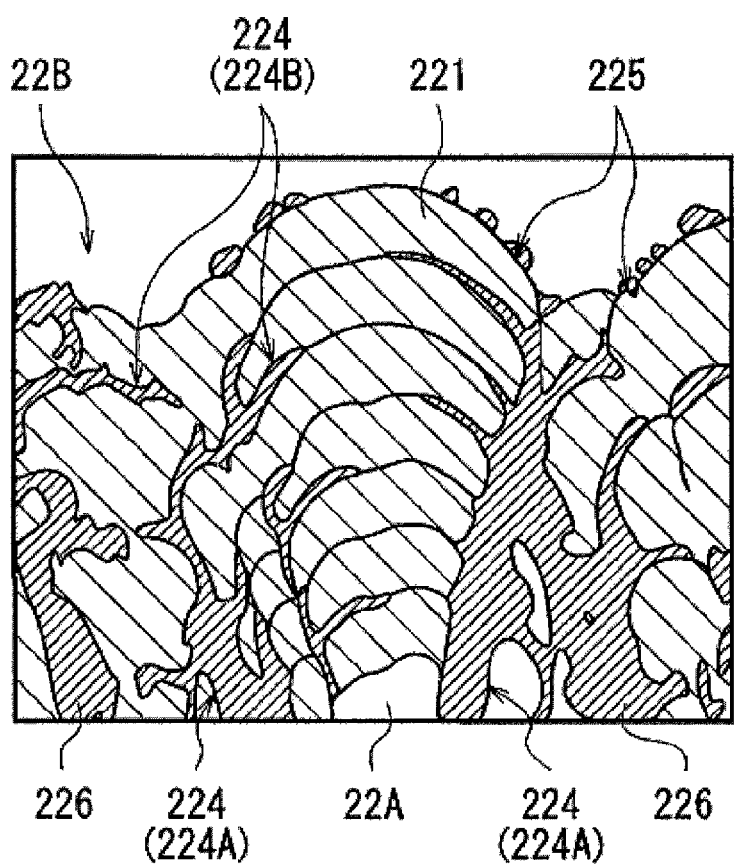
FIG. 6 is a representation of a SEM photograph illustrating another cross sectional structure of the anode shown in FIG. 2 and a schematic view thereof.

FIG. 6 illustrates another cross sectional structure of the anode 22, and correspond to FIG. 5. The anode active material layer 22B has a metal material 226 not being alloyed with lithium in the gaps 224A and 224B. In this case, only one of the gaps 224A and 224B may have the metal material 226, but the both gaps 224A and 224B preferably have the metal material 226, since thereby higher effect is obtained.

The metal material 226 intrudes into the gap 224A between adjacent anode active material particles 221. More specifically, in the case where the anode active material particles 221 are formed by vapor-phase deposition method or the like, the anode active material particles 221 are grown for every projection section existing on the surface of the anode current collector 22A as described above, and thus the gap 224A is generated between the adjacent anode active material particles 221. The gap 224A causes lowering of the binding characteristics of the anode active material layer 22B. Therefore, to improve the binding characteristics, the metal material 226 fills in the foregoing gap 224A. In this case, it is enough that part of the gap 224A is filled therewith, but the larger filling amount is preferable, since thereby the binding characteristics of the anode active material layer 22B are further improved. The filling amount of the metal material 226 is preferably 20% or more, more preferably 40% or more, and much more preferably 80% or more.

Further, the metal material 226 intrudes into the gap 224B in the anode active material particles 221. More specifically, in the case where the anode active material particles 221 have a multilayer structure, the gap 224B is generated between each layer. The gap 224B causes lowering of the binding characteristics of the anode active material layer 22B as the foregoing gap 224A does. Therefore, to improve the binding characteristics, the metal material 226 fills in the foregoing gap 224B. In this case, it is enough that part of the gap 224B is filled therewith, but the larger filling amount is preferable, since thereby the binding characteristics of the anode active material layer 22B are further improved.

To prevent the fibrous minute projection section (not illustrated) generated on the exposed face of the uppermost layer of the anode active material particles 221 from adversely affecting the performance of the secondary battery, the anode active material layer 22B may have the metal material 226 in the void 225. More specifically, in the case where the anode active material particles 221 are formed by vapor-phase deposition method or the like, the fibrous minute projection sections are generated on the surface thereof, and thus the void 225 is generated between the projection sections. The void 225 causes increase of the surface area of the anode active material particles 221, and accordingly the amount of an irreversible coat formed on the surface is also increased, possibly resulting in lowering of progression of the electrode reaction (charge and discharge reaction). Therefore, to avoid the lowering of progression of the electrode reaction, the foregoing void 225 is filled with the metal material 226. In this case, it is enough at minimum that part of the void 225 is filled therewith, but the larger filling amount is preferable, since thereby the lowering of progression of the electrode reaction is further prevented. In FIG. 6, the metal material 226 is dotted on the surface of the uppermost layer of the anode active material particles 221, which means that the foregoing minute projection section exists in the location where the metal material 226 is dotted. It is needless to say that the metal material 226 is not necessarily dotted on the surface of the anode active material particles 221, but may cover the entire surface thereof.

In particular, the metal material 226 that intrudes into the gap 224B has a function to fill in the void 225 in each layer. More specifically, in the case where the anode material is deposited several times, the foregoing minute projection section is generated on the surface of the anode active material particle 221 for every deposition. Therefore, the metal material 226 fills in not only the gap 224B in each layer, but also the void 225 in each layer.

In FIGS. 5 and 6, the description has been given of a case that the anode active material particles 221 have the multilayer structure, and both the gaps 224A and 224B exist in the anode active material layer 22B. Thus, in this case, the anode active material layer 22B has the metal material 226 in the gaps 224A and 224B. Meanwhile, in the case where the anode active material particles 221 have a single layer structure, and only the gap 224A exists in the anode active material layer 22B, the anode active material layer 22B has the metal material 226 only in the gap 224A. It is needless to say that the void 225 is generated in the both cases, and thus in any case, the metal material 226 is included in the void 225.

The separator 23 separates the cathode 21 from the anode 22, and passes lithium ions while preventing current short circuit due to contact of the both electrodes. The separator 23 is made of, for example, a porous film made of a synthetic resin such as polytetrafluoroethylene, polypropylene, and polyethylene, a ceramic porous film or the like. The separator 23 may have a structure in which two or more porous films as the foregoing porous films are layered.

An electrolytic solution as a liquid electrolyte is impregnated in the separator 23. The electrolytic solution contains a solvent and an electrolyte salt dissolved therein.

The solvent contains at least one of organic acids shown in Chemical formula 1, since thereby the chemical stability of the electrolytic solution is improved. The organic acids shown in Chemical formula 1 are a compound that has a portion including an electron attractive group such as a carbonyl group (—C(=O)—) and a sulfonyl group (—S(=O)$_2$—) in the center and has a hydroxyl group (—OH) on the both ends.

Chemical formula 1

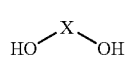

In the formula, X is —(O=)C—(C(R1)$_2$)$_a$—C(=O)—, —(R2)$_2$C—(C(R1)$_2$)$_b$—C(=O)—, —(O=)$_2$S—(C(R3)$_2$)$_c$—S(=O)$_2$—, —(R4)$_2$C—(C(R3)$_2$)$_d$—S(=O)$_2$—, or —(O=)C—(C(R5)$_2$)$_e$—S(=O)$_2$—. R1 to R5 are a hydrogen group, an alkyl group, an aryl group, a halogen group, an alkyl halide group, or an aryl halide group. a to e are one of integer numbers 0 to 4.

"Alkyl halide group" or "aryl halide group" described above is a group obtained by substituting at least partial hydrogen out of an alkyl group or an aryl group with halogen.

The halogen type in Chemical formula 1 is not particularly limited, but fluorine is specially preferable since thereby chemical stability of the electrolytic solution is improved compared to other halogen. That is, as the halogen group, the alkyl halide group, or the aryl halide group in Chemical formula 1, a fluorine group, a fluorinated alkyl group, or a fluorinated aryl group is preferable.

a to e in Chemical formula 1 are not particularly limited as long as a to e are one of integer numbers 0 to 4. Specially, a to e is preferably 0, since thereby chemical stability of the electrolytic solution is improved compared to the case where a to e are a number other than 0.

The content of the organic acid shown in Chemical formula 1 in the solvent is able to be set voluntarily, but is preferably small as much as possible. In the case where the content of the organic acid is excessively large, the chemical stability of the electrolytic solution may be lowered adversely. To improve the chemical stability of the electrolytic solution and obtain a superior battery capacity and superior cycle characteristics, the content of the organic acid is preferably in the range from 0.01 wt % to 3 wt %, both inclusive, and more preferably in the range from 0.01 wt % to 1 wt %, both inclusive. In the case where the content of the organic acid is smaller than 0.01 wt %, there is a possibility that the chemical stability of the electrolytic solution is not sufficiently and safely obtained. Meanwhile, in the case where the content of the organic acid is larger than 3 wt %, as described, the chemical stability of the electrolytic solution may be lowered, and the battery capacity may be lowered.

As a specific example of the organic acid shown in Chemical formula 1, compounds shown in Chemical formula 2(1) to 11(6) are included. For confirmation, a description will be given of X type. In Chemical formulas 2(1) to 3(6), X is —(O=)C—(C(R1)$_2$)$_a$—C(=O)—. In Chemical formulas 4(1) to 5(9), X is —(R2)$_2$C—(C(R1)$_2$)$_b$—C(=O)—. In Chemical formulas 6(1) to 7(6), X is —(O=)$_2$S—(C(R3)$_2$)$_c$—S(=O)$_2$—. In Chemical formulas 8(1) to 9(9), X is —(R4)$_2$C—(C(R3)$_2$)$_d$—S(=O)$_2$—. In Chemical formulas 10(1) to 11(6), X is —(O=)C—(C(R5)$_2$)$_e$—S(=O)$_2$—.

Chemical formula 2

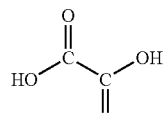

(1)

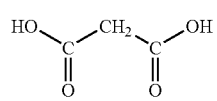

(2)

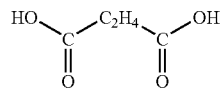

(3)

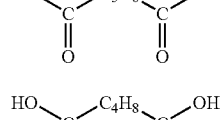

(4)

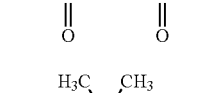

(5)

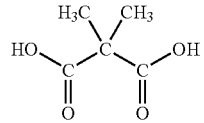

(6)

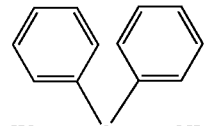

(7)

Chemical formula 3

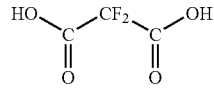

(1)

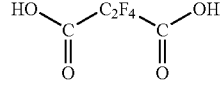

(2)

-continued
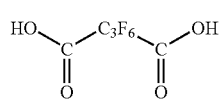 (3)
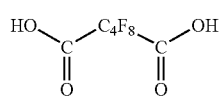 (4)
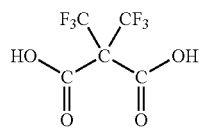 (5)
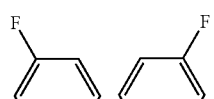 (6)
Chemical formula 4
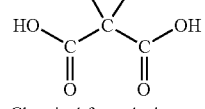 (1)
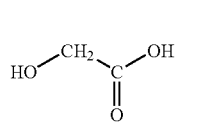 (2)
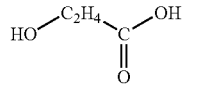 (3)
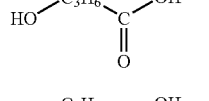 (4)
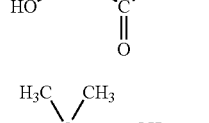 (5)
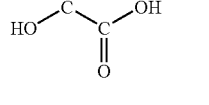 (6)
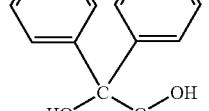 (7)
-continued
Chemical formula 5
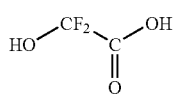 (1)
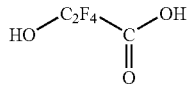 (2)
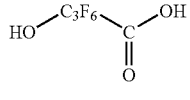 (3)
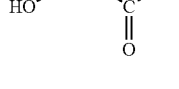 (4)
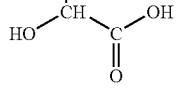 (5)
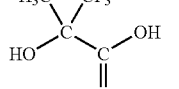 (6)
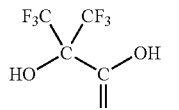 (7)
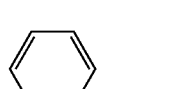 (8)
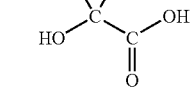 (9)
Chemical formula 6
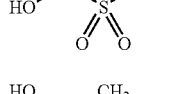 (1)
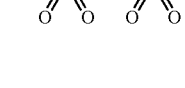 (2)

Chemical formula 7

Chemical formula 8

Chemical formula 9

-continued

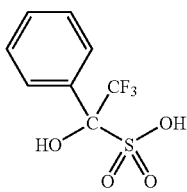

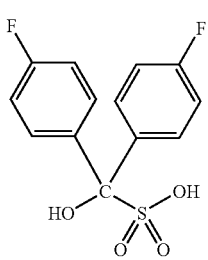

Chemical formula 10

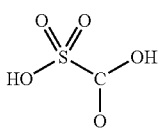

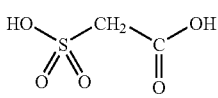

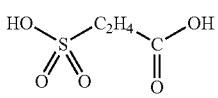

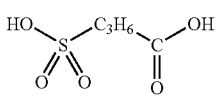

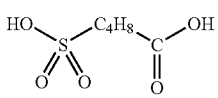

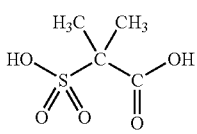

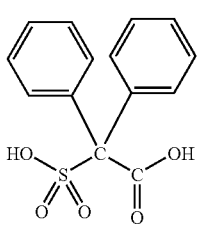

Chemical formula 11

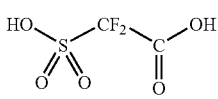

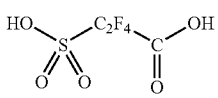

-continued

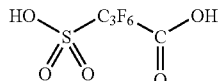

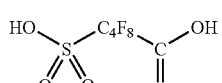

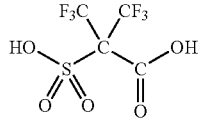

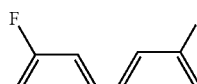

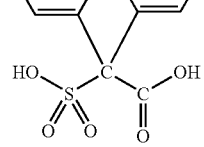

It is needless to say that the organic acid is not limited to the compounds having the structures shown in Chemical formulas 2(1) to 11(6), as long as the organic acid has the structure shown in Chemical formula 1. In this case, for a compound in which a geometric isomer exists, the geometric isomer is also included.

The solvent may contain one or more nonaqueous solvents such as other organic solvent together with the organic acid shown in Chemical formula 1. The following series of solvents may be combined voluntarily.

As the nonaqueous solvent, for example, ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethylacetic acid methyl, trimethylacetic acid ethyl, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide and the like are included. Specially, at least one selected from the group consisting of ethylene carbonate, propylene carbonate, dimethyl carbonate, diethyl carbonate, and ethyl methyl carbonate is preferable. In this case, a mixture of a high viscosity (high dielectric constant) solvent (for example, specific inductive $\in \geqq 30$) such as ethylene carbonate and propylene carbonate and a low viscosity solvent (for example, viscosity$\leqq 1$ mPa·s) such as dimethyl carbonate, ethylmethyl carbonate, and diethyl carbonate is more preferable. Thereby, dissociation property of the electrolyte salt and ion mobility are improved In particular, the solvent preferably contains at least one of a chain ester carbonate having halogen as an element shown in Chemical formula 12 and a cyclic ester carbonate having halogen as an element shown in Chemical formula 13. Thereby, a stable protective film is formed on the surface of the anode 22 and decomposition reaction of the electrolytic solution is prevented.

Chemical formula 12

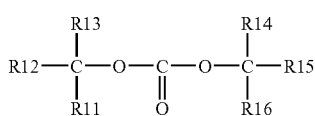

In the formula, R11 to R16 are a hydrogen group, a halogen group, an alkyl group, or an alkyl halide group. At least one of R11 to R16 is the halogen group or the alkyl halide group.

Chemical formula 13

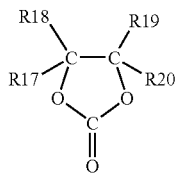

In the formula, R17 to R20 are a hydrogen group, a halogen group, an alkyl group, or an alkyl halide group. At least one of R17 to R20 is the halogen group or the alkyl halide group.

R11 to R16 in Chemical formula 12 may be identical or different. That is, types of R11 to R16 may be individually set in the range of the foregoing groups. The same is applied to R17 to R20 in Chemical formula 13.

The halogen type is not particularly limited, but fluorine, chlorine, or bromine is preferable, and fluorine is specially preferable since thereby higher effect is obtained compared to other halogen.

The number of halogen is more preferably two than one, and further may be three or more, since thereby an ability to form the protective film is improved and more rigid and stable protective film is formed. Accordingly, decomposition reaction of the electrolytic solution is further prevented.

As the chain ester carbonate having halogen shown in Chemical formula 12, for example, fluoromethyl methyl carbonate, bis(fluoromethyl) carbonate, difluoromethyl methyl carbonate and the like are included. One thereof may be used singly, or a plurality thereof may be used by mixture. Specially, bis(fluoromethyl) carbonate is preferable, since thereby high effect is obtained.

As the cyclic ester carbonate having halogen shown in Chemical formula 13, for example, the series of compounds shown in Chemical formulas 14(1) to 15(9) are included. That is, 4-fluoro-1,3-dioxolane-2-one of Chemical formula 14(1), 4-chloro-1,3-dioxolane-2-one of Chemical formula 14(2), 4,5-difluoro-1,3-dioxolane-2-one of Chemical formula 14(3), tetrafluoro-1,3-dioxolane-2-one of Chemical formula 14(4), 4-chloro-5-aluoro-1,3-dioxolane-2-one of Chemical formula 14(5), 4,5-dichloro-1,3-dioxolane-2-one of Chemical formula 14(6), tetrachloro-1,3-dioxolane-2-one of Chemical formula 14(7), 4,5-bistrifluoromethyl-1,3-dioxolane 2-one of Chemical formula 14(8), 4-trifluoro methyl-1,3-dioxolane-2-one of Chemical formula 14(9), 4,5-difluoro-4,5-dimethyl-1,3-dioxolane-2-one of Chemical formula 14(10), 4,4-difluoro-5-methyl-1,3-dioxolane-2-one of Chemical formula 14(11), 4-ethyl-5,5-difluoro-1,3-dioxolane-2-one of Chemical formula 14(12) and the like are included. Further, 4-fluoro-5-trifluoromethyl-1,3-dioxolane-2-one of Chemical formula 15(1), 4-methyl-5-trifluoromethyl-1,3-dioxolane-2-one of Chemical formula 15(2), 4-fluoro-4,5-dimethyl-1,3-dioxolane-2-one of Chemical formula 15(3), 5-(1,1-difluoroethyl)-4,4-difluoro-1,3-dioxolane-2-one of Chemical formula 15(4), 4,5-dichloro-4,5-dimethyl-1,3-dioxolane-2-one of Chemical formula 15(5), 4-ethyl-5-fluoro-1,3-dioxolane-2-one of Chemical formula 15(6), 4-ethyl-4,5-difluoro-1,3-dioxolane-2-one of Chemical formula 15(7), 4-ethyl-4,5,5-trifluoro-1,3-dioxolane-2-one of Chemical formula 15(8), 4-fluoro-4-methyl-1,3-dioxolane-2-one of Chemical formula 15(9) and the like are included. One thereof may be used singly, or a plurality thereof may be used by mixture.

Chemical formula 14

(1)

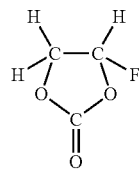

(2)

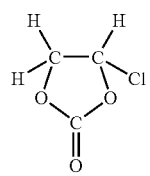

(3)

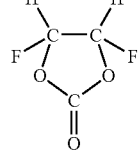

(4)

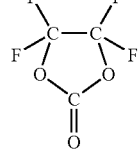

(5)

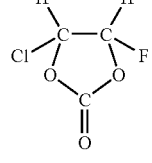

(6)

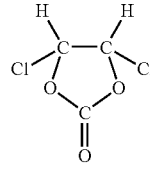

(7)

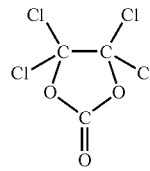

(8) 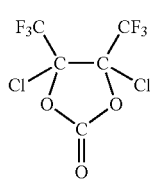

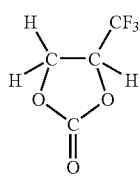

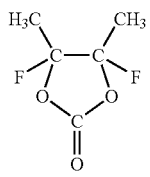

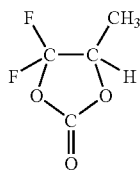

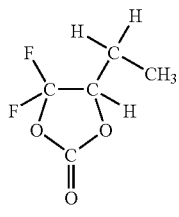

Chemical formula 15

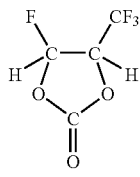

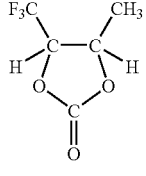

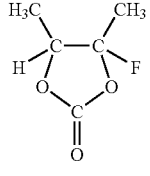

(9) 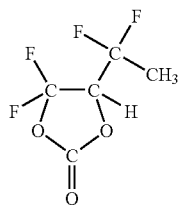

(10) 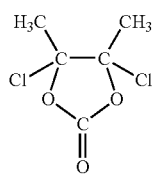

(11) 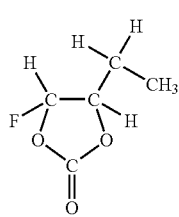

(12) 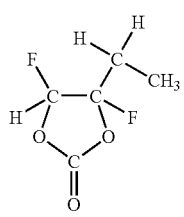

(1) 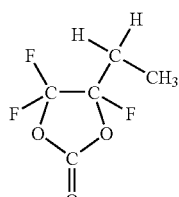

(2) 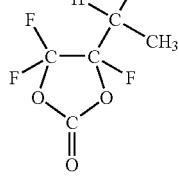

(3) 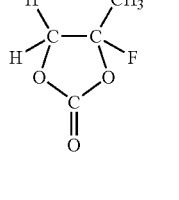

Specially, 4-fluoro-1,3-dioxolane-2-one or 4,5-difluoro-1,3-dioxolane-2-one is preferable, and 4,5-difluoro-1,3-dioxolane-2-one is more preferable. In particular, as 4,5-difluoro-1,3-dioxolane-2-one, a trans isomer is more preferable than a cis isomer, since the trans isomer is easily available and provides high effect.

The solvent preferably contains a cyclic ester carbonate having an unsaturated bond shown in Chemical formula 16 to Chemical formula 18. Thereby, the chemical stability of the electrolytic solution is further improved. One thereof may be used singly, or a plurality thereof may be used by mixture.

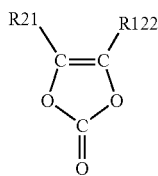

Chemical formula 16

In the formula, R21 and R22 are a hydrogen group or an alkyl group.

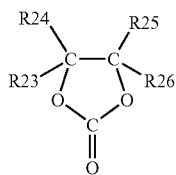

Chemical formula 17

In the formula, R23 to R26 are a hydrogen group, an alkyl group, a vinyl group, or an aryl group. At least one of R23 to R26 is the vinyl group or the aryl group.

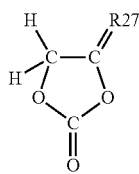

Chemical formula 18

In the formula, R27 is an alkylene group.

The cyclic ester carbonate having an unsaturated bond shown in Chemical formula 16 is a vinylene carbonate compound. As the vinylene carbonate compound, for example, vinylene carbonate (1,3-dioxole-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, 4-trifluoromethyl-1,3-dioxole-2-one and the like are included. Specially, vinylene carbonate is preferable, since vinylene carbonate is easily available, and provides high effect.

The cyclic ester carbonate having an unsaturated bond shown in Chemical formula 17 is a vinylethylene carbonate compound. As the vinylethylene carbonate compound, for example, vinylethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, 4,5-divinyl-1,3-dioxolane-2-one and the like are included. Specially, vinylethylene carbonate is preferable, since vinylethylene carbonate is easily available, and provides high effect. It is needless to say that all of R23 to R26 may be the vinyl group or the aryl group. Otherwise, it is possible that some of R23 to R26 are the vinyl group, and the others thereof are the aryl group.

The cyclic ester carbonate having an unsaturated bond shown in Chemical formula 18 is a methylene ethylene carbonate compound. As the methylene ethylene carbonate compound, 4-methylene-1,3-dioxolane-2-one, 4,4-dimethyl-5-methylene-1,3-dioxolane-2-one, 4,4-diethyl-5-methylene-1, 3-dioxolane-2-one and the like are included. The methylene ethylene carbonate compound may have one methylene group (compound shown in Chemical formula 18), or have two methylene groups.

The cyclic ester carbonate having an unsaturated bond may be catechol carbonate having a benzene ring or the like, in addition to the compounds shown in Chemical formula 16 to Chemical formula 18.

Further, the solvent preferably contains sultone (cyclic sulfonic ester) and an acid anhydride, since thereby chemical stability of the electrolytic solution is further improved.

As the sultone, for example, propane sultone, propene sultone or the like is included. Specially, propene sultone is preferable. Such sultone may be used singly, or a plurality thereof may be used by mixture. The sultone content in the solvent is, for example, in the range from 0.5 wt % to 5 wt %, both inclusive.

As the acid anhydride, for example, carboxylic anhydride such as succinic anhydride, glutaric anhydride, and maleic anhydride; disulfonic anhydride such as ethane disulfonic anhydride and propane disulfonic anhydride; an anhydride of carboxylic acid and sulfonic acid such as sulfobenzoic anhydride, sulfopropionic anhydride, and sulfobutyric anhydride and the like are included. Specially, succinic anhydride or sulfobenzoic anhydride is preferable. The anhydrides may be used singly, or a plurality thereof may be used by mixture. The content of the acid anhydride in the solvent is, for example, in the range from 0.5 wt % to 5 wt %, both inclusive.

The electrolyte salt contains, for example, one or more light metal salts such as a lithium salt. The series of electrolyte salts described below may be combined voluntarily.

As the lithium salt, for example, lithium hexafluorophosphate, lithium tetrafluoroborate, lithium perchlorate, lithium hexafluoroarsenate, lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr) and the like are included, since thereby superior battery capacity is obtained.

Specially, at least one selected from the group consisting of lithium hexafluorophosphate, lithium tetrafluoroborate, lithium perchlorate, and lithium hexafluoroarsenate is preferable, and lithium hexafluorophosphate is more preferable, since the internal resistance is lowered, and thus higher effect is obtained.

In particular, the electrolyte salt preferably contains at least one selected from the group consisting of the compounds shown in Chemical formula 19 to Chemical formula 21. Thereby, in the case where such a compound is used together with the foregoing lithium hexafluorophosphate or the like, higher effect is obtained. R31 and R33 in Chemical formula 19 may be identical or different. The same is applied to R41 to R43 in Chemical formula 20 and R51 and R52 in Chemical formula 21.

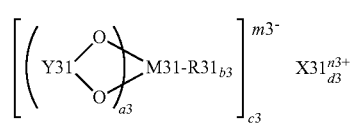

Chemical formula 19

In the formula, X31 is a Group 1 element or a Group 2 element in the long period periodic table or aluminum. M31 is a transition metal element, a Group 13 element, a Group 14 element, or a Group 15 element in the long period periodic table. R31 is a halogen group. Y31 is —(O=)C—R32-C(=O)—, —(O=)C—C(R33)$_2$—, or —(O=)C—C(=O)—. R32 is an alkylene group, an alkylene halide group, an arylene group, or an arylene halide group. R33 is an alkyl group, an alkyl halide group, an aryl group, or an aryl halide group. a3 is one of integer numbers 1 to 4. b3 is 0, 2, or 4. c3, d3, m3, and n3 are one of integer numbers 1 to 3.

Chemical formula 20

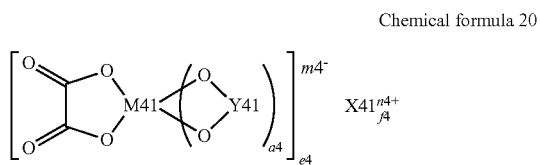

In the formula, X41 is a Group 1 element or a Group 2 element in the long period periodic table. M41 is a transition metal element, a Group 13 element, a Group 14 element, or a Group 15 element in the long period periodic table. Y41 is —(O=)C—(C(R41)$_2$)$_{b4}$—C—(=O)—, —(R43)$_2$C—(C(R42)$_2$)$_{c4}$—C—(=O)—, —(R43)$_2$C—(C(R42)$_2$)$_{c4}$—C(R43)$_2$—, —(R43)$_2$C—(C(R42)$_2$)$_{c4}$—S—(=O)$_2$—, —(O=)$_2$S—(C(R42)$_2$)$_{d4}$—S(=O)$_2$—, or —(O=)C—(C(R42)$_2$)$_{d4}$—S—(=O)$_2$—. R41 and R43 are a hydrogen group, an alkyl group, a halogen group, or an alkyl halide group. At least one of R41/R43 is respectively the halogen group or the alkyl halide group. R42 is a hydrogen group, an alkyl group, a halogen group, or an alkyl halide group. a4, e4, and n4 are an integer number of 1 or 2. b4 and d4 are one of integer numbers 1 to 4. c4 is one of integer numbers 0 to 4. f4 and m4 are one of integer numbers 1 to 3.

Chemical formula 21

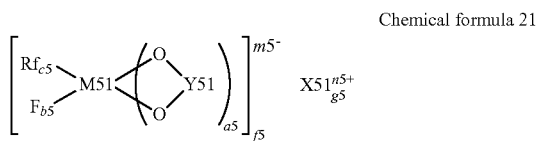

In the formula, X51 is a Group 1 element or a Group 2 element in the long period periodic table. M51 is a transition metal element, a Group 13 element, a Group 14 element, or a Group 15 element in the long period periodic table. Rf is a fluorinated alkyl group with the carbon number in the range from 1 to 10, both inclusive or a fluorinated aryl group with the carbon number in the range from 1 to 10, both inclusive. Y51 is —(O=)C—(C(R51)$_2$)$_{d5}$—C(=O)—, —(R52)$_2$C—(C(R51)$_2$)$_{d5}$—C(=O)—, —(R52)$_2$C—(C(R51)$_2$)$_{d5}$—C(R52)$_2$—, —(R52)$_2$C—(C(R51)$_2$)$_{d5}$—S(=O)$_2$—, —(O=)$_2$—S(C(R51)$_2$)$_{e5}$—S(=O)$_2$—, or —(O=)C—(C(R51)$_2$)$_{e5}$—S(=O)$_2$—. R51 is a hydrogen group, an alkyl group, a halogen group, or an alkyl halide group. R52 is a hydrogen group, an alkyl group, a halogen group, or an alkyl halide group, and at least one thereof is the halogen group or the alkyl halide group. a5, f5, and n5 are 1 or 2. b5, c5, and e5 are one of integer numbers 1 to 4. d5 is one of integer numbers 0 to 4. g5 and m5 are one of integer numbers 1 to 3.

The long period periodic table is shown in "Inorganic chemistry nomenclature (revised edition)" proposed by IUPAC (International Union of Pure and Applied Chemistry). Specifically, Group 1 element represents hydrogen, lithium, sodium, potassium, rubidium, cesium, and francium. Group 2 element represents beryllium, magnesium, calcium, strontium, barium, and radium. Group 13 element represents boron, aluminum, gallium, indium, and thallium. Group 14 element represents carbon, silicon, germanium, tin, and lead. Group 15 element represents nitrogen, phosphorus, arsenic, antimony, and bismuth.

As a compound shown in Chemical formula 19, for example, the compounds shown in Chemical formulas 22(1) to 22(6) and the like are included. As a compound shown in Chemical formula 20, for example, the compounds shown in Chemical formulas 23(1) to 23(8) and the like are included. As a compound shown in Chemical formula 21, for example, the compound shown in Chemical formula 24 and the like are included. It is needless to say that the compound is not limited to the compounds shown in Chemical formula 22(1) to Chemical formula 23(8), and the compound may be other compound as long as such a compound has the structure shown in Chemical formula 19 to Chemical formula 21.

Chemical formula 22

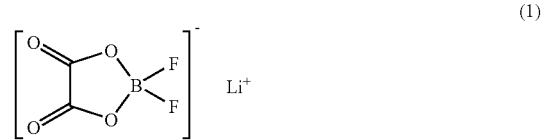
(1)

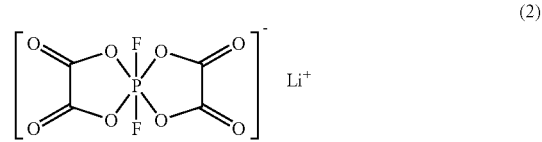
(2)

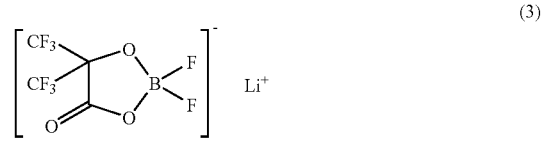
(3)

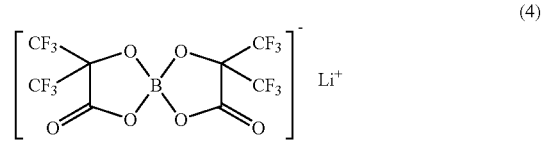
(4)

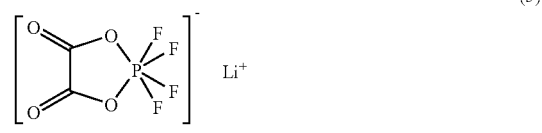
(5)

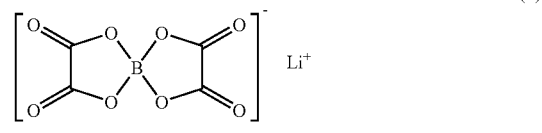
(6)

Chemical formula 23

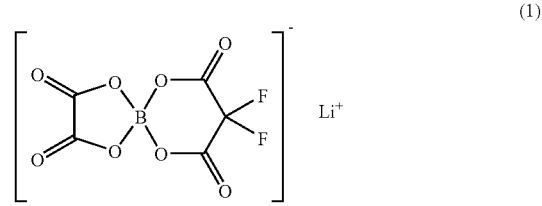
(1)

-continued (2) 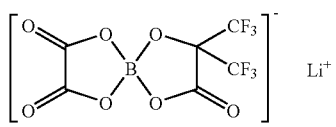

(3) 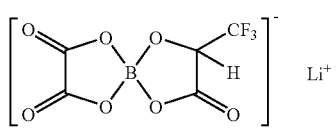

(4) 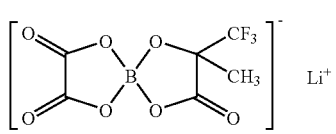

(5) 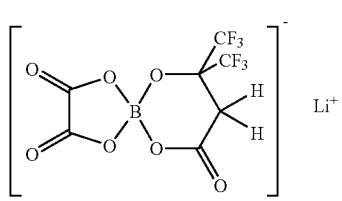

(6) 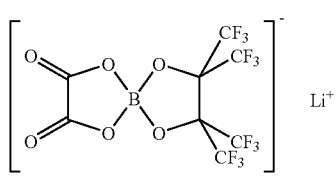

(7) 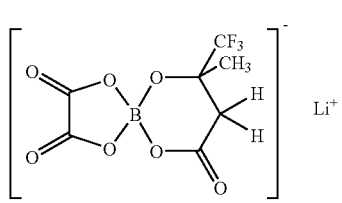

(8) 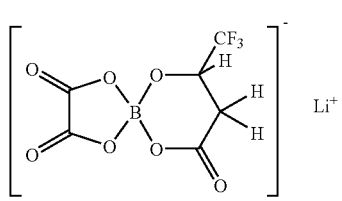

Chemical formula 24

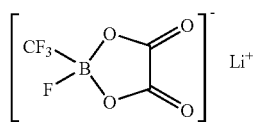

Further, the electrolyte salt may contain at least one selected from the group consisting of the compounds shown in Chemical formula 25 to Chemical formula 27. Thereby, in the case where such a compound is used together with the foregoing lithium hexafluorophosphate or the like, higher effect is obtained. m and n in Chemical formula 25 may be identical or different. The same is applied to p, q, and r in Chemical formula 27.

Chemical formula 25

$LiN(C_mF_{2m+1}SO_2)(C_nF_{2n+1}SO_2)$

In the formula, m and n are an integer number of 1 or more.

Chemical formula 26

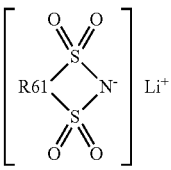

In the formula, R61 is a straight chain/branched perfluoro alkylene group with the carbon number in the range from 2 to 4, both inclusive.

Chemical formula 27

$LiC(C_pF_{2p+1}SO_2)(C_qF_{2q+1}SO_2)(C_rF_{2r+1}SO_2)$

In the formula, p, q, and r are an integer number of 1 or more.

As the chain compound shown in Chemical formula 25, for example, lithium bis(trifluoromethanesulfonyl)imide (LiN($CF_3SO_2$)$_2$), lithium bis(pentafluoroethanesulfonyl)imide (LiN($C_2F_5SO_2$)$_2$), lithium (trifluoromethanesulfonyl)(pentafluoroethanesulfonyl)imide (LiN($CF_3SO_2$)($C_2F_5SO_2$)), lithium(trifluoromethanesulfonyl)(heptafluoropropanesulfonyl)imide (LiN($CF_3SO_2$)($C_3F_7SO_2$)), lithium(trifluoromethanesulfonyl)(nonafluorobutanesulfonyl)imide (LiN($CF_3SO_2$)($C_4F_9SO_2$)) and the like are included. One thereof may be used singly, or a plurality thereof may be used by mixture.

As the cyclic compound shown in Chemical formula 26, for example, the series of compounds shown in Chemical formulas 28(1) to 28(4) are included. That is, lithium 1,2-perfluoroethanedisulfonylimide shown in Chemical formula 28(1), lithium 1,3-perfluoropropanedisulfonylimide shown in Chemical formula 28(2), lithium 1,3-perfluorobutanedisulfonylimide shown in Chemical formula 28(3), lithium 1,4-perfluorobutanedisulfonylimide shown in Chemical formula 28(4) and the like are included. One thereof may be used singly, or a plurality thereof may be used by mixture. Specially, lithium 1,2-perfluoroethanedisulfonylimide is preferable, since thereby high effect is obtained.

Chemical formula 28

(1) 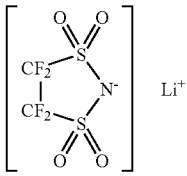

(2) 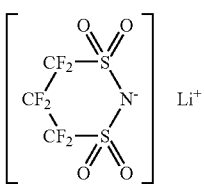

-continued

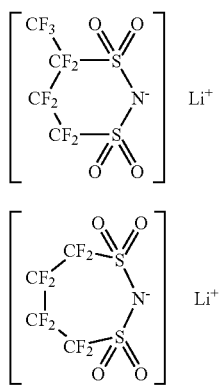

(3)

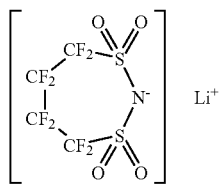

(4)

As the chain compound shown in Chemical formula 27, for example, lithium tris(trifluoromethanesulfonyl)methyde (LiC(CF$_3$SO$_2$)$_3$) and the like are included.

The content of the electrolyte salt to the solvent is preferably in the range from 0.3 mol/kg to 3.0 mol/kg, both inclusive. If out of the foregoing range, there is a possibility that the ion conductivity is significantly lowered.

The secondary battery is manufactured, for example, by the following procedure.

First, the cathode 21 is formed. First, a cathode active material, a cathode binder, and a cathode electrical conductor are mixed to prepare a cathode mixture, which is dispersed in an organic solvent to form paste cathode mixture slurry. Subsequently, the both faces of the cathode current collector 21A are uniformly coated with the cathode mixture slurry by a doctor blade, a bar coater or the like, which is dried. Finally, the coating is compression-molded by a rolling press machine or the like while being heated if necessary to form the cathode active material layer 21B. In this case, the coating may be compression-molded over several times.

Next, the anode 22 is formed. First, the anode current collector 22A made of an electrolytic copper foil or the like is prepared. After that, the anode material is deposited on the both faces of the anode current collector 22A by vapor-phase deposition method such as evaporation method to form the plurality of anode active material particles having silicon as an element. After that, the oxide-containing film is formed by liquid-phase method such as liquid-phase precipitation method, or the metal material is formed by liquid-phase deposition method such as electrolytic plating method, or the both thereof are formed, and thereby the anode active material layer 22B is formed.

Next, a solvent is prepared by mixing at least one of the organic solvents shown in Chemical formula 1, other organic solvent and the like. After that, an electrolyte salt is dissolved in the solvent to prepare the electrolytic solution.

The secondary battery is assembled as follows. First, the cathode lead 25 is attached to the cathode current collector 21A by welding or the like, and the anode lead 26 is attached to the anode current collector 22A by welding or the like. Subsequently, the cathode 21 and the anode 22 are layered and spirally wound with the separator 23 in between to form the spirally wound electrode body 20. After that, the center pin 24 is inserted in the center of the spirally wound electrode body 20. Subsequently, while the spirally wound electrode body 20 is sandwiched between the pair of insulating plates 12 and 13, the spirally wound electrode body 20 is contained in the battery can 11, an end of the cathode lead 25 is welded to the safety valve mechanism 15, and an end of the anode lead 26 is welded to the battery can 11. Subsequently, the foregoing electrolytic solution is injected into the battery can 11, and impregnated in the separator 23. Finally, the battery cover 14, the safety valve mechanism 15, and the PTC device 16 are fixed at the open end portion of the battery can 11 by being caulked with the gasket 17. Accordingly, the secondary battery illustrated in FIG. 1 and FIG. 2 is thereby completed.

In the secondary battery, when charged, for example, lithium ions are extracted from the cathode 21, and are inserted in the anode 22 through the electrolytic solution impregnated in the separator 23. Meanwhile, when discharged, for example, lithium ions are extracted from the anode 22, and are inserted in the cathode 21 through the electrolytic solution impregnated in the separator 23.

According to the cylindrical secondary battery, the anode active material layer 22B of the anode 22 contains the plurality of anode active material particles having silicon. In addition, the anode active material layer 22B of the anode 22 contains at least one of the oxide-containing film covering the surface of the anode active material particles and the metal material not being alloyed with lithium provided in a gap in the anode active material layer 22B. Further, the solvent of the electrolytic solution contains at least one of the organic acids shown in Chemical formula 1. In this case, compared to a case that the anode active material layer does not contain the oxide-containing film and the metal material, expansion and shrinkage of the anode active material layer 22B in charge and discharge are prevented, and decomposition reaction of the electrolytic solution is prevented. Further, compared to a case that the solvent of the electrolytic solution does not contain the organic acid shown in Chemical formula 1, the chemical stability of the electrolytic solution is improved, and thus decomposition reaction of the electrolytic solution in charge and discharge is prevented. Therefore, while the initial charge and discharge characteristics are secured, the cycle characteristics are able to be improved. In this case, in the case where the content of the organic acid in the solvent is in the range from 0.01 wt % to 3 wt %, both inclusive, higher effect is able to be obtained.

In particular, in the case where the anode 22 has silicon advantageous to realizing a high capacity as an anode active material, the cycle characteristics are significantly improved. Thus, higher effect is able to be obtained compared to a case that the anode 22 contains other anode material such as a carbon material.

In addition, in the case where the solvent of the electrolytic solution contains at least one of the chain ester carbonate having halogen as an element shown in Chemical formula 12 and the cyclic ester carbonate having halogen as an element shown in Chemical formula 13; at least one of the cyclic ester carbonate having an unsaturated bond shown in Chemical formula 16 to Chemical formula 18; sultone; or an acid anhydride, higher effect is able to be obtained. In particular, in the case where at least one of the chain ester carbonate having halogen shown in Chemical formula 12 and the cyclic ester carbonate having halogen shown in Chemical formula 13 is used, the larger the number of halogen is, the higher the effect is.

Further, in the case where the electrolyte salt of the electrolytic solution contains at least one selected from the group consisting of lithium hexafluorophosphate, lithium tetrafluoroborate, lithium perchlorate, and lithium hexafluoroarsenate; at least one selected from the group consisting of the compounds shown in Chemical formula 19 to Chemical formula 21; or at least one selected from the group consisting of the compounds shown in Chemical formula 25 to Chemical formula 27, higher effect is able to be obtained.

Second Embodiment

Next, a description will be given of a second embodiment.

Figure 7:
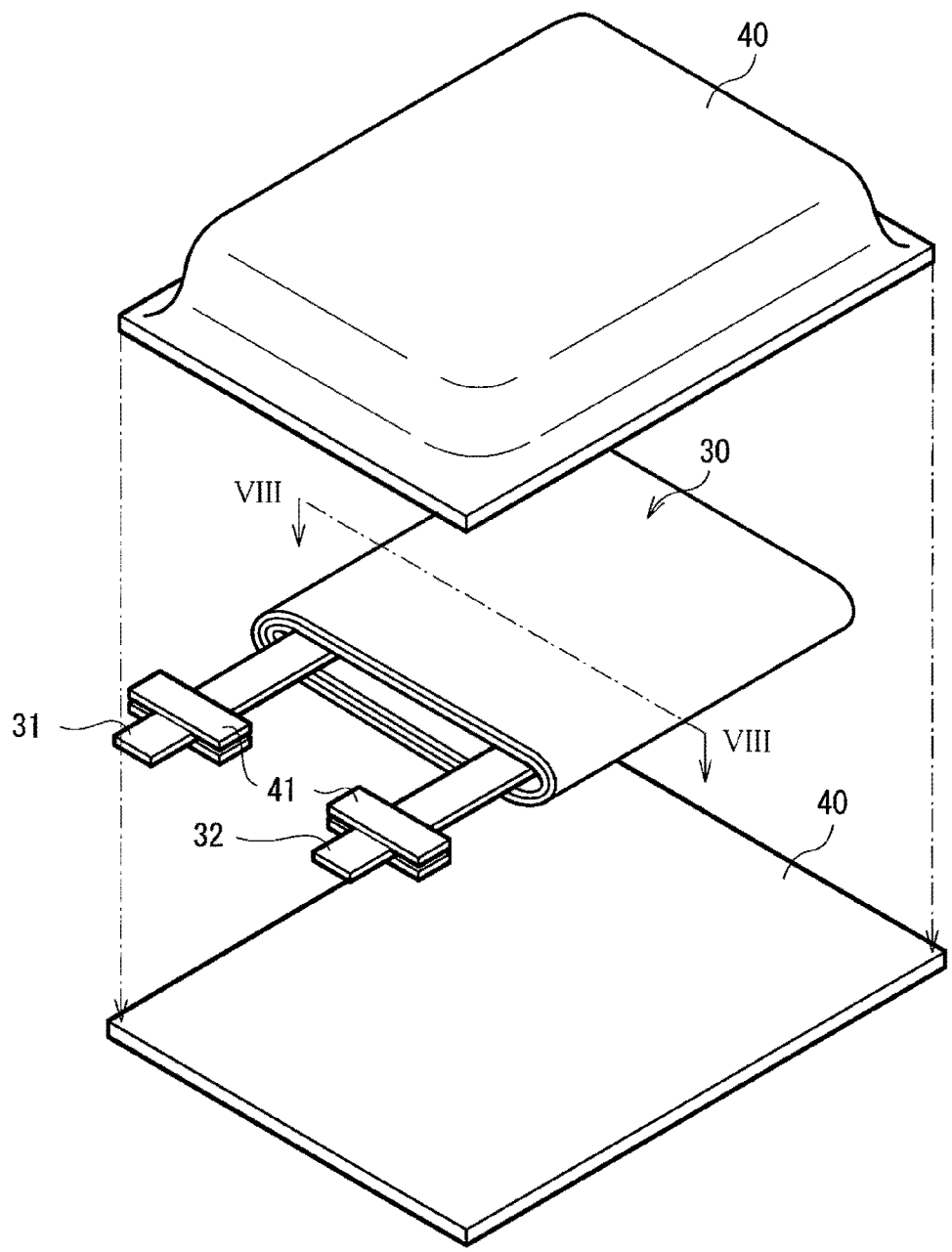
FIG. 7 is a cross sectional view illustrating a structure of a secondary battery according to a second embodiment.
Figure 8:
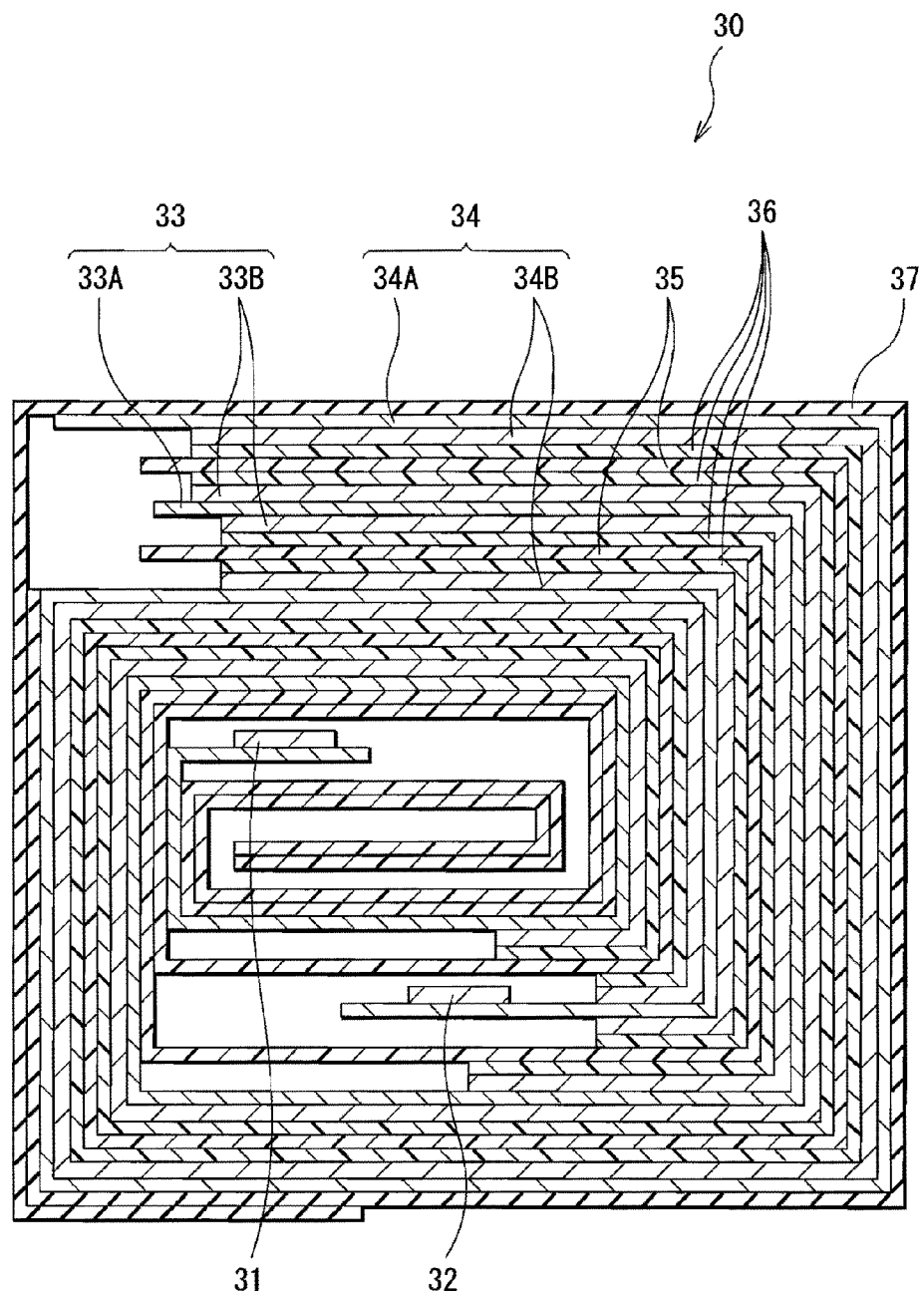
FIG. 8 is a cross sectional view taken along line VIII-VIII of the spirally wound electrode body shown in FIG. 7.

FIG. 7 illustrates an exploded perspective structure of a secondary battery according to the second embodiment. FIG. 8 illustrates an enlarged cross section taken along line VIII-VIII of a spirally wound electrode body 30 illustrated in FIG. 7.

The secondary battery is, for example, a lithium ion secondary battery similar to the foregoing first secondary battery in the first embodiment. In the secondary battery, the spirally wound electrode body 30 on which a cathode lead 31 and an anode lead 32 are attached is contained in a film package member 40. The battery structure using the film package member 40 is called laminated film structure.

The cathode lead 31 and the anode lead 32 are respectively directed from inside to outside of the package member 40 in the same direction, for example. The cathode lead 31 is made of, for example, a metal material such as aluminum, and the anode lead 32 is made of, for example, a metal material such as copper, nickel, and stainless. The metal materials are in the shape of a thin plate or mesh.

The package member 40 is made of an aluminum laminated film in which, for example, a nylon film, an aluminum foil, and a polyethylene film are bonded together in this order. The package member 40 has, for example, a structure in which the respective outer edges of 2 pieces of rectangle aluminum laminated films are bonded with each other by fusion bonding or an adhesive so that the polyethylene film and the spirally wound electrode body 30 are opposed to each other.

An adhesive film 41 to protect from entering of outside air is inserted between the package member 40 and the cathode lead 31, the anode lead 32. The adhesive film 41 is made of a material having contact characteristics to the cathode lead 31 and the anode lead 32. Examples of such a material include, for example, a polyolefin resin such as polyethylene, polypropylene, modified polyethylene, and modified polypropylene.

The package member 40 may be made of a laminated film having other lamination structure, a polymer film such as polypropylene, or a metal film, instead of the foregoing aluminum laminated film.

In the spirally wound electrode body 30, a cathode 33 and an anode 34 are layered with a separator 35 and an electrolyte 36 in between and then spirally wound. The outermost periphery thereof is protected by a protective tape 37.

The cathode 33 has a structure in which, for example, a cathode active material layer 33B is provided on the both faces of a cathode current collector 33A. The anode 34 has, for example, a structure in which an anode active material layer 34B is provided on the both faces of an anode current collector 34A. The anode 34 is arranged so that the anode active material layer 34B is opposed to the cathode active material layer 33B. The structures of the cathode current collector 33A, the cathode active material layer 33B, the anode current collector 34A, the anode active material layer 34B, and the separator 35 are respectively similar to those of the cathode current collector 21A, the cathode active material layer 21B, the anode current collector 22A, the anode active material layer 22B, and the separator 23 in the foregoing secondary battery of the first embodiment.

The electrolyte 36 is a so-called gel electrolyte, containing an electrolytic solution and a polymer compound that holds the electrolytic solution. The gel electrolyte is preferable, since thereby high ion conductivity (for example, 1 mS/cm or more at room temperature) is obtained and liquid leakage is prevented.

The composition of the electrolytic solution is similar to the composition of the electrolytic solution in the foregoing secondary battery of the first embodiment.

As the polymer compound, for example, polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, polycarbonate and the like are included. One of these polymer compounds may be used singly, or a plurality thereof may be used by mixture. Specially, polyacrylonitrile, polyvinylidene fluoride, polyhexafluoropropylene, or polyethylene oxide is preferably used, since such a compound is electrochemically stable.

In the electrolyte 36 that is a gel electrolyte, a solvent of the electrolytic solution means a wide concept including not only the liquid solvent but also a solvent having ion conductivity capable of dissociating the electrolyte salt. Therefore, when the polymer compound having ion conductivity is used, the polymer compound is also included in the solvent.

Instead of the gel electrolyte 36 in which the electrolytic solution is held by the polymer compound, the electrolytic solution may be directly used. In this case, the electrolytic solution is impregnated in the separator 35.

The secondary battery is manufactured, for example, by the following three manufacturing methods.

In the first manufacturing method, first, for example, the cathode 33 is formed by forming the cathode active material layer 33B on the both faces of the cathode current collector 33A, and the anode 34 is formed by forming the anode active material layer 34B on the both faces of the anode current collector 34A by a procedure similar to the procedure of forming the cathode 21 and the anode 22 in the foregoing secondary battery of the first embodiment. Subsequently, a precursor solution containing an electrolytic solution, a polymer compound, and a solvent is prepared. After the cathode 33 and the anode 34 are coated with the precursor solution, the solvent is volatilized to form the gel electrolyte 36. Subsequently, the cathode lead 31 is attached to the cathode current collector 33A, and the anode lead 32 is attached to the anode current collector 34A. Subsequently, the cathode 33 and the anode 34 provided with the electrolyte 36 are layered with the separator 35 in between to obtain a laminated body. After that, the laminated body is spirally wound in the longitudinal direction, the protective tape 37 is adhered to the outermost periphery thereof to form the spirally wound electrode body 30. Finally, for example, after the spirally wound electrode body 30 is sandwiched between 2 pieces of the film package members 40, outer edges of the package members 40 are contacted by thermal fusion bonding or the like to enclose the spirally wound electrode body 30. At this time, the adhesive films 41 are inserted between the cathode lead 31, the anode lead 32 and the package member 40. Thereby, the secondary battery illustrated in FIG. 7 and FIG. 8 is completed.

In the second manufacturing method, first, the cathode lead 31 is attached to the cathode 33, and the anode lead 32 is attached to the anode 34. After that, the cathode 33 and the anode 34 are layered with the separator 35 in between and spirally wound. The protective tape 37 is adhered to the outermost periphery thereof, and thereby a spirally wound body as a precursor of the spirally wound electrode body 30 is formed. Subsequently, after the spirally wound body is sandwiched between 2 pieces of the film package members 40, the outermost peripheries except for one side are bonded by thermal fusion bonding or the like to obtain a pouched state, and the spirally wound body is contained in the pouch-like package member 40. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 40. After that, the opening of the package member 40 is hermetically sealed by thermal fusion bonding or the like. Finally, the monomer is thermally polymerized to obtain a polymer compound. Thereby, the gel electrolyte 36 is formed. Accordingly, the secondary battery is completed.

In the third manufacturing method, the spirally wound body is formed and contained in the pouch-like package member 40 in the same manner as that of the foregoing second manufacturing method, except that the separator 35 with the both faces coated with a polymer compound is used firstly. As the polymer compound with which the separator 35 is coated, for example, a polymer containing vinylidene fluoride as a component, that is, a homopolymer, a copolymer, a multicomponent copolymer and the like are included. Specifically, polyvinylidene fluoride, a binary copolymer containing vinylidene fluoride and hexafluoropropylene as a component, a ternary copolymer containing vinylidene fluoride, hexafluoropropylene, and chlorotrifluoroethylene as a component and the like are included. As a polymer compound, in addition to the foregoing polymer containing vinylidene fluoride as a component, another one or more polymer compounds may be contained. Subsequently, an electrolytic solution is prepared and injected into the package member 40. After that, the opening of the package member 40 is sealed by thermal fusion bonding or the like. Finally, the resultant is heated while a weight is applied to the package member 40, and the separator 35 is contacted with the cathode 33 and the anode 34 with the polymer compound in between. Thereby, the electrolytic solution is impregnated into the polymer compound, and the polymer compound is gelated to form the electrolyte 36. Accordingly, the secondary battery is completed.

In the third manufacturing method, the swollenness of the secondary battery is prevented compared to the first manufacturing method. Further, in the third manufacturing method, the monomer, the solvent and the like as a raw material of the polymer compound are hardly left in the electrolyte 36 compared to the second manufacturing method. In addition, the formation step of the polymer compound is favorably controlled. Thus, sufficient contact characteristics are obtained between the cathode 33/the anode 34/the separator 35 and the electrolyte 36.

According to the laminated film secondary battery, the anode 34 and the electrolytic solution have the structure and the composition similar to those of the anode 22 and the electrolytic solution in the foregoing secondary battery of the first embodiment. Thus, the cycle characteristics are able to be improved while the initial charge and discharge characteristics are secured. Effect of the secondary battery other than the foregoing effect is similar to that of the secondary battery of the first embodiment.

EXAMPLES

Examples of the application will be described in detail.

Example 1-1

The laminated film secondary battery illustrated in FIG. 7 and FIG. 8 was fabricated by the following procedure. The secondary battery was fabricated as a lithium ion secondary battery in which the capacity of the anode 34 was expressed based on insertion and extraction of lithium.

First, the cathode 33 was formed. First, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium cobalt complex oxide ($LiCoO_2$) was obtained. Subsequently, 91 parts by mass of the lithium cobalt complex oxide as a cathode active material, 3 parts by mass of polyvinylidene fluoride as a cathode binder, and 6 parts by mass of graphite as a cathode electrical conductor were mixed to obtain a cathode mixture. After that, the cathode mixture was dispersed in N-methyl-2-pyrrolidone to obtain paste cathode mixture slurry. Finally, the both faces of the cathode current collector 33A made of a strip-shaped aluminum foil (thickness: 12 μm) were uniformly coated with the cathode mixture slurry by a bar coater, which was dried. After that, the resultant was compression-molded by a roll pressing machine to form the cathode active material layer 33B.

Next, the anode 34 was formed. First, the anode current collector 34A made of a roughened electrolytic copper foil (thickness: 22 μm) was prepared. After that, by depositing silicon as an anode active material on the both faces of the anode current collector 34A by electron beam evaporation method, a plurality of anode active material particles were formed. The anode active material particles were formed by ten deposition steps so that the anode active material particles had ten layer structure. The thickness of the anode active material particles on a single face side of the anode current collector 34A (total thickness) was 6 μm. Subsequently, silicon oxide ($SiO_2$) was precipitated on the surface of the anode active material particles by liquid-phase precipitation method, and thereby an oxide-containing film was formed. In forming the oxide-containing film, the anode current collector 34A on which the anode active material particles were formed was dipped in a solution in which boron was dissolved as an anion capture agent in hydrofluosilic acid for 3 hours, the silicon oxide was precipitated on the surface of the anode active material particles, and then the resultant was washed and dried under the reduced pressure. Finally, by electrolytic plating method, a cobalt (Co) plating film was grown on the anode current collector 34A on which the plurality of anode active material particles and the oxide-containing film were formed to form a metal material. Thereby, the anode active material layer 34B was formed. In forming the metal material, a current was applied while air was supplied to a plating bath, and thereby cobalt was deposited on the both faces of the anode current collector 34A. As a plating solution, a cobalt plating solution, Japan Pure Chemical Co., Ltd. make was used, the current density was in the range from 2 $A/dm^2$ to 5 $A/dm^2$, both inclusive, and the plating rate was 10 nm/sec.

Next, an electrolytic solution was prepared. First, ethylene carbonate (EC) and diethyl carbonate (DEC) were mixed. After that, the compound shown in Chemical formula 2(1) as an organic acid shown in Chemical formula 1 was added thereto to prepare a solvent. The mixture ratio between EC and DEC was 30:70 at a weight ratio. The content of the compound shown in Chemical formula 2(1) in the solvent was 0.01 wt %. After that, lithium hexafluorophosphate ($LiPF_6$) as an electrolyte salt was dissolved in the solvent. The content of lithium hexafluorophosphate to the solvent was 1 mol/kg.

Finally, the secondary battery was assembled by using the cathode 33, the anode 34, and the electrolytic solution. First, the cathode lead 31 made of aluminum was welded to one end of the cathode current collector 33A, and the anode lead 32 made of nickel was welded to one end of the anode current collector 34A. Subsequently, the cathode 33, the separator 35 (thickness: 25 µm) made of a microporous polypropylene film, and the anode 54 were layered and spirally wound. After that, the end portion of the spirally wound body was fixed by the protective tape 37 made of an adhesive tape, and thereby a spirally wound body as a precursor of the spirally wound electrode body 30 was formed. Subsequently, the spirally wound body was sandwiched between the package members 40 made of a 3-layer laminated film (total thickness: 100 µm) in which a nylon film (thickness: 30 µm), an aluminum foil (thickness: 40 µm), and a non-stretch polypropylene film (thickness 30 µm) were layered from the outside. After that, outer edges other than an edge of one side of the package members were thermally fusion-bonded with each other. Thereby, the spirally wound body was contained in the package members 40 in a pouched state. Subsequently, the electrolytic solution was injected through the opening of the package member 40, the electrolytic solution was impregnated in the separator 35, and thereby the spirally wound electrode body 30 was formed. Finally, the opening of the package member 40 was sealed by thermal fusion bonding in the vacuum atmosphere, and thereby the laminated film secondary battery was completed. For the secondary battery, lithium metal was not precipitated on the anode 34 in a state of full charge by adjusting the thickness of the cathode active material layer 33B.

Examples 1-2 to 1-5

A procedure was performed in the same manner as that of Example 1-1, except that the content of the compound shown in Chemical formula 2(1) was changed to 0.1 wt % (Example 1-2), 0.5 wt % (Example 1-3), 1 wt % (Example 1-4), or 3 wt % (Example 1-5).

Comparative Example 1-1

A procedure was performed in the same manner as that of Example 1-1, except that the oxide-containing film and the metal material were not formed, and the compound shown in Chemical formula 2(1) was not formed.

Comparative Example 1-2

A procedure was performed in the same manner as that of Example 1-1, except that the compound shown in Chemical formula 2(1) was not formed.

Comparative Example 1-3

A procedure was performed in the same manner as that of Example 1-4, except that the oxide-containing film and the metal material were not formed.

The cycle characteristics and the initial charge and discharge characteristics for the secondary batteries of Examples 1-1 to 1-5 and Comparative examples 1-1 to 1-3 were examined. The results shown in Table 1 were obtained.

In examining the cycle characteristics, first, charge and discharge were performed 2 cycles in the atmosphere of 23 deg C., and thereby the discharge capacity at the second cycle was measured. Subsequently, the secondary battery was repeatedly charged and discharged in the same atmosphere until the total number of cycles became 100 cycles to measure the discharge capacity at the 100th cycle. Finally, the discharge capacity retention ratio (%)=(discharge capacity at the 100th cycle/discharge capacity at the second cycle)×100 was calculated. The charge and discharge conditions were as follows. That is, after constant current and constant voltage charge was performed at a current of 0.2 C until the upper voltage reached 4.2 V, constant current discharge was performed at a current of 0.2 C until the final voltage reached 2.7 V. "0.2 C" means a current value at which the theoretical capacity is completely discharged in 5 hours.

In examining the initial charge and discharge characteristics, first, charge and discharge were performed 2 cycles in the atmosphere of 23 deg C., and then charge was performed to measure a charge capacity. Subsequently, the secondary battery was discharged in the same atmosphere to measure a discharge capacity. Finally, the initial charge and discharge efficiency (%)=(discharge capacity/charge capacity)×100 was calculated. The charge and discharge condition was similar to that of the case examining the cycle characteristics.

The foregoing procedures and the foregoing conditions in examining the cycle characteristics and the initial charge and discharge characteristics are similarly applied to the following series of examples and comparative examples.

TABLE 1

Anode active material: silicon

| | Anode | | Electrolytic solution | | | | Discharge capacity retention ratio (%) | Initial charge and discharge efficiency (%) |
|---|---|---|---|---|---|---|---|---|
| | Oxide-containing film | Metal material | Electrolyte salt | Solvent | | | | |
| | | | | Type | Organic acid Type | wt % | | |
| Example 1-1 | $SiO_2$ | Co | $LiPF_6$ 1 mol/kg | EC + DEC | Chemical formula 2(1) | 0.01 | 80 | 87.5 |
| Example 1-2 | | | | | | 0.1 | 81 | 87.2 |
| Example 1-3 | | | | | | 0.5 | 82 | 86.8 |
| Example 1-4 | | | | | | 1 | 84 | 86.2 |
| Example 1-5 | | | | | | 3 | 87 | 82.5 |
| Comparative example 1-1 | — | — | $LiPF_6$ 1 mol/kg | EC + DEC | — | — | 40 | 88.0 |
| Comparative example 1-2 | $SiO_2$ | Co | | | — | — | 75 | 88.5 |
| Comparative example 1-3 | — | — | | | Chemical formula 2(1) | 1 | 80 | 68.0 |

As shown in Table 1, in Examples 1-1 to 1-5 in which the anode active material layer 34B of the anode 34 contained the oxide-containing film and the metal material, and the solvent of the electrolytic solution contained the compound shown in Chemical formula 2(1), compared to in comparative examples 1-1 to 1-3, higher initial charge and discharge efficiency of 80% or more was obtained, and the discharge capacity retention ratio was higher independently of the content of the compound of Chemical formula 2(1).

More specifically, in Comparative example 1-2 in which the oxide-containing film and the metal material were contained but the compound shown in Chemical formula 2(1) was not contained, compared to in Comparative example 1-1 in which the oxide-containing film and the metal material were not contained and the compound shown in Chemical formula 2(1) was not contained, higher initial charge and discharge efficiency of 80% or more was obtained, and the discharge capacity retention ratio was significantly higher. The result showed that the oxide-containing film and the metal material increased the discharge capacity retention ratio without lowering the initial charge and discharge efficiency. However, the discharge capacity retention ratio obtained in Comparative example 1-2 was not sufficient, and thus it was not possible to sufficiently improve the discharge capacity retention ratio with only the oxide-containing film and the metal material.

Further, in Comparative example 1-3 in which the oxide-containing film and the metal material were not contained but the compound shown in Chemical formula 2(1) was contained, compared to in Comparative example 1-1, the discharge capacity retention ratio was significantly higher but the initial charge and discharge efficiency was under 80%. The result showed that the compound shown in Chemical formula 2(1) increased the discharge capacity retention ratio but decreased the initial charge and discharge efficiency.

Meanwhile, in Examples 1-1 to 1-5 in which the oxide-containing film and the metal material were contained and the compound shown in Chemical formula 2(1) was contained, differently from in comparative examples 1-1 to 1-3, higher initial charge and discharge efficiency of 80% or more was obtained, and a high discharge capacity retention ratio of 80% or more was obtained. The result showed that in the case where the oxide-containing film, the metal material, and the compound shown in Chemical formula 2(1) were used together, the discharge capacity retention ratio was significantly improved while lowering of the initial charge and discharge efficiency was prevented.

In particular, in Examples 1-1 to 1-5, there was tendency that as the content of the compound shown in Chemical formula 2(1) was increased, the discharge capacity retention ratio was increased and the initial charge and discharge efficiency was decreased. In this case, in the case where the content was smaller than 0.01 wt %, the discharge capacity retention ratio was not sufficiently high. In this case, in the case where the content was larger than 3 wt %, the battery capacity was easily lowered while a high discharge capacity retention ratio and high initial charge and discharge efficiency were obtained. Further, in the case where the content was larger than 1 wt %, the initial charge and discharge efficiency was easily lowered.

Accordingly, it was confirmed that in the secondary battery in an embodiment, in the case where the anode active material layer 34B of the anode 34 contained the oxide-containing film and the metal material, and the solvent of the electrolytic solution contained the compound shown in Chemical formula 2(1), the cycle characteristics were improved while the initial charge and discharge characteristics were secured. It was also confirmed that in this case, in the case where the content of the compound shown in Chemical formula 2(1) in the solvent was in the range from 0.01 wt % to 3 wt %, both inclusive, a superior battery capacity, superior cycle characteristics, and superior initial charge and discharge characteristics were obtained.

Examples 2-1 to 2-6

A procedure was performed in the same manner as that of Example 1-4, except that as the organic acid shown in Chemical formula 1, the compound shown in Chemical formula 2(2) (Example 2-1), the compound shown in Chemical formula 2(3) (Example 2-2), the compound shown in Chemical formula 5(7) (Example 2-3), the compound shown in Chemical formula 6(3) (Example 2-4), the compound shown in Chemical formula 10(2) (Example 2-5), or the compound shown in Chemical formula 11 (1) (Example 2-6) was used instead of the compound shown in Chemical formula 2(1).

The cycle characteristics and the initial charge and discharge characteristics for the secondary batteries of Examples 2-1 to 2-6 were examined. The results shown in Table 2 were obtained.

TABLE 2

Anode active material: silicon

| | Anode | | Electrolytic solution | | | | Discharge capacity retention ratio (%) | Initial charge and discharge efficiency (%) |
|---|---|---|---|---|---|---|---|---|
| | Oxide-containing film | Metal material | Electrolyte salt | Solvent | | | | |
| | | | | Type | Organic acid Type | wt % | | |
| Example 1-4 | SiO$_2$ | Co | LiPF$_6$ 1 mol/kg | EC + DEC | Chemical formula 2(1) | 1 | 84 | 86.2 |
| Example 2-1 | | | | | Chemical formula 2(2) | | 82 | 87.0 |
| Example 2-2 | | | | | Chemical formula 2(3) | | 80 | 87.0 |
| Example 2-3 | | | | | Chemical formula 5(7) | | 77 | 88.0 |

TABLE 2-continued

Anode active material: silicon

| | Anode | | Electrolyte salt | Electrolytic solution | | | Discharge capacity retention ratio (%) | Initial charge and discharge efficiency (%) |
|---|---|---|---|---|---|---|---|---|
| | Oxide-containing film | Metal material | | Solvent Type | Organic acid Type | wt % | | |
| Example 2-4 | | | | | Chemical formula 6(3) | | 78 | 88.0 |
| Example 2-5 | | | | | Chemical formula 10(2) | | 80 | 85.2 |
| Example 2-6 | | | | | Chemical formula 11(1) | | 78 | 84.2 |
| Comparative example 1-1 | — | — | LiPF$_6$ 1 mol/kg | EC + DEC | — | — | 40 | 88.0 |
| Comparative example 1-2 | SiO$_2$ | Co | | | — | — | 75 | 88.5 |
| Comparative example 1-3 | — | — | | | Chemical formula 2(1) | 1 | 80 | 68.0 |

As shown in Table 2, in Examples 2-1 to 2-6 in which the compound shown in Chemical formula 2(2) or the like was used, compared to in comparative examples 1-1 to 1-3, higher initial charge and discharge efficiency of 80% or more was obtained, and a higher discharge capacity retention ratio of almost 80% or more was obtained as in Example 1-4.

Accordingly, it was confirmed that in the secondary battery in an embodiment, in the case where the anode active material layer 34B of the anode 34 contained the oxide-containing film and the metal material, and the solvent of the electrolytic solution contained the compound shown in Chemical formula 2(2) or the like, the cycle characteristics were improved while the initial charge and discharge characteristics were secured.

Table 1 and Table 2 illustrate only the results in the case where the organic acid shown in Chemical formula 1 was singly used, but do not illustrate results in the case where two or more of the organic acids are mixed. However, it is evident from the results of Table 1 and Table 2 that effect was obtained in the case where the organic acid shown in Chemical formula 1 was singly used. There is no particular reason that effect is lost in the case where two or more of the organic acids are mixed. Therefore, it is evident that in the case where two or more of the organic acids shown in Chemical formula 1 are mixed, effect similar to that in the case where the organic acid shown in Chemical formula 1 was singly used is obtained as well.

Accordingly, from the results of Table 1 and Table 2, it was confirmed that in the secondary battery of the present application, in the case where the anode active material layer 34B of the anode 34 contained the oxide-containing film and the metal material, and the solvent of the electrolytic solution contained the organic acid shown in Chemical formula 1, the cycle characteristics were improved while the initial charge and discharge characteristics were secured. It was also confirmed that in this case, in the case where the content of the organic acid in the solvent was in the range from 0.01 wt % to 3 wt %, both inclusive, a superior battery capacity, superior cycle characteristics, and superior initial charge and discharge characteristics were obtained.

Examples 3-1 and 3-2

A procedure was performed in the same manner as that of Example 1-4, except that dimethyl carbonate (DMC: Example 3-1) or ethylmethyl carbonate (EMC: Example 3-2) was used as a solvent instead of DEC.

Example 3-3

A procedure was performed in the same manner as that of Example 1-4, except that propylene carbonate (PC) was added as a solvent, and the composition of the solvent (EC:PC:DEC) was 10:20:70 at a weight ratio.

Examples 3-4 to 3-7

A procedure was performed in the same manner as that of Example 1-4, except that as a solvent, bis(fluoromethyl) carbonate (DFDMC) as a chain ester carbonate having halogen shown in Chemical formula 12 (Example 3-4), 4-fluoro-1,3-dioxolane-2-one as a cyclic ester carbonate having halogen shown in Chemical formula 13 (FEC: Example 3-5), 4,5-difluoro-1,3-dioxolane-2-one as a cyclic ester carbonate having halogen shown in Chemical formula 13 (DFEC: Example 3-6), or vinylene carbonate as a cyclic ester carbonate having an unsaturated bond shown in Chemical formula 16 (VC: Example 3-7) was added. The content of DFDMC or the like in the solvent was 5 wt %.

Examples 3-8 and 3-9

A procedure was performed in the same manner as that of Example 1-4, except that as a solvent, propene sultone as sultone (PRS: Example 3-8) or sulfobenzoic anhydride as an acid anhydride (SBAH: Example 3-9) was added. The content of PRS or the like in the solvent was 1 wt %.

Comparative Examples 2-1 to 2-4

A procedure was performed in the same manner as that of Examples 3-5 to 3-7 and 3-9, except that the oxide-containing film and the metal material were not formed, and the compound shown in Chemical formula 2(1) was not formed.

Comparative Examples 2-5 to 2-8

A procedure was performed in the same manner as that of Examples 3-5 to 3-7 and 3-9, except that the compound shown in Chemical formula 2(1) was not formed.

The cycle characteristics and the initial charge and discharge characteristics for the secondary batteries of Examples 3-1 to 3-9 and Comparative examples 2-1 to 2-8 were examined. The results shown in Table 3 and Table 4 were obtained.

TABLE 3

Anode active material: silicon

| | Anode | | Electrolytic solution | | | | | Discharge capacity retention ratio (%) | Initial charge and discharge efficiency (%) |
|---|---|---|---|---|---|---|---|---|---|
| | Oxide-containing film | Metal material | Electrolyte salt | Solvent Type | Organic acid Type | wt % | Others | | |
| Example 1-4 | $SiO_2$ | Co | $LiPF_6$ 1 mol/kg | EC + DEC | Chemical formula 2(1) | 1 | — | 84 | 86.2 |
| Example 3-1 | | | | EC + DMC | | | — | 86 | 86.2 |
| Example 3-2 | | | | EC + EMC | | | — | 85 | 86.2 |
| Example 3-3 | | | | EC + PC + DEC | | | — | 86 | 86.2 |
| Example 3-4 | | | | EC + DFDMC | | | — | 87 | 87.0 |
| Example 3-5 | | | | DEC   FEC | | | — | 88 | 86.2 |
| Example 3-6 | | | | t-DFEC | | | — | 94 | 86.0 |
| Example 3-7 | | | | VC | | | — | 90 | 86.6 |
| Example 3-8 | | | | EC + DEC | | | PRS | 82 | 86.0 |
| Example 3-9 | | | | | | | SBAH | 87 | 86.0 |

TABLE 4

Anode active material: silicon

| | Anode | | Electrolytic solution | | | | | Discharge capacity retention ratio (%) | Initial charge and discharge efficiency (%) |
|---|---|---|---|---|---|---|---|---|---|
| | Oxide-containing film | Metal material | Electrolyte salt | Solvent Type | Organic acid Type | wt % | Others | | |
| Comparative example 1-1 | — | — | $LiPF_6$ 1 mol/kg | EC + DEC | — | — | — | 40 | 88.0 |
| Comparative example 2-1 | | | | EC + DEC   FEC | | | | 66 | 87.8 |
| Comparative example 2-2 | | | | t-DFEC | | | | 80 | 87.2 |
| Comparative example 2-3 | | | | VC | | | | 70 | 87.2 |
| Comparative example 2-4 | | | | EC + DEC | — | — | SBAH | 45 | 87.5 |
| Comparative example 1-2 | $SiO_2$ | Co | $LiPF_6$ 1 mol/kg | EC + DEC | — | — | — | 75 | 88.5 |
| Comparative example 2-5 | | | | EC + DEC   FEC | | | | 84 | 88.3 |
| Comparative example 2-6 | | | | t-DFEC | | | | 90 | 88.0 |
| Comparative example 2-7 | | | | VC | | | | 87 | 88.0 |
| Comparative example 2-8 | | | | EC + DEC | | | SBAH | 80 | 88.0 |

As shown in Table 3 and Table 4, in Examples 3-1 to 3-9 in which the solvent composition was changed, compared to in comparative examples 1-1, 1-2, and 2-1 to 2-8, initial charge and discharge efficiency of 80% or more was obtained and the discharge capacity retention ratio was higher as in Example 1-4.

In particular, in Examples 3-1 to 3-3 in which DEC was changed to DMC or the like, or PC was added, initial charge and discharge efficiency equal to that of Example 1-4 was obtained, and the discharge capacity retention ratio was higher than that of Example 1-4.

Further, in Examples 3-4 to 3-7 in which DFDMC or the like was added, compared to Example 1-4, the discharge capacity retention ratio was higher while initial charge and discharge efficiency of 80% or more was maintained. In this case, as evidenced by comparison between Example 3-5 and Example 3-6, there was a tendency that the number of halogen was larger, the discharge capacity retention ratio was higher.

Further, in Examples 3-8 and 3-9 in which PRS or SBAH was added, compared to Example 1-4, almost similar discharge capacity retention ratios and almost similar initial charge and discharge efficiency were obtained.

Only the results in the case where the cyclic ester carbonate having an unsaturated bond shown in Chemical formula 16 (vinylene carbonate compound) was used as a solvent are herein shown, but no results in the case where the cyclic ester carbonate having an unsaturated bond shown in Chemical formula 17 or Chemical formula 18 (vinylethylene carbonate compound or the like) was used are herein shown. However, the vinylethylene carbonate compound or the like fulfils a function to increase the discharge capacity retention ratio as the vinylene carbonate compound does. Thus, it is evident that in the case where the former was used, effect similar to that in the case where the latter is used is obtained as well. The same is applied to a case that a given mixture obtained by mixing two or more of the chain ester carbonates having halogen shown in Chemical formula 12 and the cyclic ester carbonates having halogen shown in Chemical formula 13 is used, or a case that a given mixture obtained by mixing two or more of the cyclic ester carbonates having an unsaturated bond shown in Chemical formulas 16 to 18 is used.

Accordingly, it was confirmed that in the secondary battery of the application, in the case where the solvent composition was changed, the cycle characteristics were improved while the initial charge and discharge characteristics were secured. It was also confirmed that in this case, in the case where at least one of the chain ester carbonates having halogen shown in Chemical formula 12 and the cyclic ester carbonates having halogen shown in Chemical formula 13 was used, at least one of the cyclic ester carbonates having unsaturated bond shown in Chemical formulas 16 to 18 was used, sultone was used, or an acid anhydride was used, characteristics were further improved. In particular, in the case where the chain ester carbonate having halogen shown in Chemical formula 12 or the cyclic ester carbonate having halogen shown in Chemical formula 13 was used, the larger the number of halogen was, the more the characteristics were improved.

Examples 4-1 to 4-3

A procedure was performed in the same manner as that of Example 1-4, except that lithium tetrafluoroborate (LiBF$_4$: Example 4-1), the compound shown in Chemical formula 22(6) as a compound shown in Chemical formula 19 (Example 4-2), or lithium bis(trifluoromethanesulfonyl)imide as a compound shown in Chemical formula 25 (LiTFSI: Example 4-3) was added as an electrolyte salt. The content of lithium hexafluorophosphate to the solvent was 0.9 mol/kg, and the content of lithium tetrafluoroborate or the like to the solvent was 0.1 mol/kg.

The cycle characteristics and the initial charge and discharge characteristics for the secondary batteries of Examples 4-1 to 4-3 were examined. The results shown in Table 5 were obtained.

TABLE 5

| | Anode active material: silicon | | | | | | | |
|---|---|---|---|---|---|---|---|---|
| | Anode | | Electrolytic solution | | | | Discharge capacity retention ratio (%) | Initial charge and discharge efficiency (%) |
| | Oxide-containing film | Metal material | Electrolyte salt | | Solvent | | | |
| | | | | Type | Type | Organic acid wt % | | |
| Example 1-4 | SiO$_2$ | Co | LiPF$_6$ 1 mol/kg | | EC + DEC | Chemical formula 2(1) 1 | 84 | 86.2 |
| Example 4-1 | | | LiPF$_6$ 0.9 mol/kg | LiBF$_4$ 0.1 mol/kg | | | 84 | 85.7 |
| Example 4-2 | | | LiPF$_6$ 0.9 mol/kg | Chemical formula 22(6) 0.1 mol/kg | | | 88 | 86.0 |
| Example 4-3 | | | LiPF$_6$ 0.9 mol/kg | LiTFSI 0.1 mol/kg | | | 85 | 86.2 |

As shown in Table 5, in Examples 4-1 to 4-3 in which lithium tetrafluoroborate or the like was added as an electrolyte salt, compared to Example 1-4, the discharge capacity retention ratio equal to or more than that of Example 1-4 was obtained while initial charge and discharge efficiency of 80% or more was maintained.

Only the results in the case where lithium tetrafluoroborate, or the compound shown in Chemical formula 19 or chemical formula 25 was used as an electrolyte salt are herein shown, but no results in the case where lithium perchlorate, lithium hexafluoroarsenate, or the compound shown in Chemical formula 20, 21, 26, or 27 is used are herein shown. However, lithium perchlorate or the like fulfils a function to increase the discharge capacity retention ratio as lithium tetrafluoroborate or the like does. Thus, it is evident that in the case where the former was used, effect similar to that in the case where the latter is used is obtained as well. The same is applied to a case that a given mixture obtained by mixing two or more of the foregoing series of electrolyte salts is used.

Accordingly, it was confirmed that in the secondary battery of the application, in the case where the electrolyte salt type was changed, the cycle characteristics were improved while the initial charge and discharge characteristics were secured. It was also confirmed that in this case, in the case where lithium tetrafluoroborate, lithium perchlorate, lithium hexafluoroarsenate, the compound shown in Chemical formulas 19 to 21, or the compound shown in Chemical formulas 25 to 27 was used, the characteristics were further improved.

Example 5

A procedure was performed in the same manner as that of Example 1-4, except that the metal material was not formed and only the oxide-containing film was formed.

Comparative Example 3

A procedure was performed in the same manner as that of Example 5, except that the compound shown in Chemical formula 2(1) was not formed.

The cycle characteristics and the initial charge and discharge characteristics for the secondary batteries of Example 5 and Comparative example 3 were examined. The results shown in Table 6 were obtained.

As shown in Table 6, in the case where only the oxide-containing film was formed, a result similar to the results shown in Table 1 was obtained. That is, in Example 5 in which the oxide-containing film was formed, compared to Comparative example 3 in which the oxide-containing film was not formed, initial charge and discharge efficiency of 80% or more was obtained, and the discharge capacity retention ratio was higher.

Only the result in the case where the silicon oxide was formed as the oxide-containing film is herein shown, but no results in the case where a germanium oxide or a tin oxide is used are herein shown. However, the germanium oxide or the like fulfils a function to increase the discharge capacity retention ratio as the silicon oxide does. Thus, it is evident that in the case where the former was used, effect similar to that in the case where the latter is used is obtained. The same is applied to a case that a given mixture obtained by mixing two or more of the foregoing series of oxides is used.

Accordingly, it was confirmed that in the secondary battery of the application, in the case where the anode active material layer 34B of the anode 34 contained only the oxide-containing film, the cycle characteristics were improved while the initial charge and discharge characteristics were secured as well since the solvent of the electrolytic solution contained the organic acid shown in Chemical formula 1.

Example 6

A procedure was performed in the same manner as that of Example 1-4, except that the oxide-containing film was not formed and only the metal material was formed.

Comparative Example 4

A procedure was performed in the same manner as that of Example 6, except that the compound shown in Chemical formula 2(1) was not formed.

The cycle characteristics and the initial charge and discharge characteristics for the secondary batteries of Example 6 and Comparative example 4 were examined. The results shown in Table 7 were obtained.

TABLE 6

| | Anode active material: silicon | | | | | | |
|---|---|---|---|---|---|---|---|
| | Anode | Electrolytic solution | | | | Discharge capacity retention ratio (%) | Initial charge and discharge efficiency (%) |
| | Oxide-containing film | Electrolyte salt | Type | Solvent | | | |
| | | | | Organic acid | | | |
| | | | | Type | wt % | | |
| Example 5 | $SiO_2$ | $LiPF_6$ 1 mol/kg | EC + DEC | Chemical formula 2(1) | 1 | 80 | 86.0 |
| Comparative example 3 | $SiO_2$ | $LiPF_6$ 1 mol/kg | EC + DEC | — | — | 70 | 88.5 |

TABLE 7

Anode active material: silicon

| | Anode | | Electrolytic solution | | | Discharge capacity retention ratio (%) | Initial charge and discharge efficiency (%) |
|---|---|---|---|---|---|---|---|
| | Metal material | Electrolyte salt | Solvent Type | Organic acid Type | wt % | | |
| Example 6 | Co | LiPF$_6$ 1 mol/kg | EC + DEC | Chemical formula 2(1) | 1 | 73 | 85.9 |
| Comparative example 4 | Co | LiPF$_6$ 1 mol/kg | EC + DEC | — | — | 65 | 88.2 |

As shown in Table 7, in the case where only the metal material was formed, a result similar to the results shown in Table 1 was obtained. That is, in Example 6 in which the metal material was formed, compared to Comparative example 4 in which the metal material was not formed, initial charge and discharge efficiency of 80% or more was obtained, and the discharge capacity retention ratio was higher.

Only the result in the case where the cobalt plating film was formed as a metal material is herein shown, but no results in the case where a plating film of iron, nickel, zinc, or copper is formed are herein shown. However, the plating film of iron or the like fulfils a function to increase the discharge capacity retention ratio as the cobalt plating film or the like does. Thus, it is evident that in the case where the former is used, effect similar to that in the case where the latter is used is obtained. The same is applied to a case that a given mixture obtained by mixing two or more of the foregoing series of plating films is used.

Accordingly, it was confirmed that in the secondary battery of the application, in the case where the anode active material layer 34B of the anode 34 contained only the metal material, the cycle characteristics were improved while the initial charge and discharge characteristics were secured as well since the solvent of the electrolytic solution contained the organic acid shown in Chemical formula 1.

When comparison was made between three examples as Examples 1-4, 1-5, and 1-6 in which the content of the compound shown in Chemical formula 2(1) was identical, the discharge capacity retention ratio in the case where both the oxide-containing film and the metal material were formed was higher than that in the case where only one of the oxide-containing film and the metal material was formed. Further, the discharge capacity retention ratio in the case where only the oxide-containing film was formed was higher than that in the case where only the metal material was formed.

Accordingly, it was confirmed that in the secondary battery of the application, in the case where both the oxide-containing film and the metal material were formed, the cycle characteristics were further improved than in the case where only one of the oxide-containing film and the metal material was formed. In addition, it was confirmed that in the case where only one of the oxide-containing film and the metal material was formed, the cycle characteristics were further improved with the use of the oxide-containing film than with the use of the metal material.

From the results of Table 1 to Table 7, in the secondary battery of the application, it was confirmed that in the case where the anode active material layer of the anode contained the plurality of the anode active material particles having silicon, the anode active material layer contained at least one of the oxide-containing film and the metal material, and the solvent of the electrolytic solution contained at least one of the organic acids shown in Chemical formula 1, the cycle characteristics were improved while the initial charge and discharge characteristics were secured independently of the solvent composition and the electrolyte salt type.

The present application has been described with reference to the embodiments and the examples. However, the application is not limited to the aspects described in the foregoing embodiments and the foregoing examples, and various modifications may be made. For example, in the foregoing embodiments and the foregoing examples, the description has been given of the lithium ion secondary battery in which the anode capacity is expressed based on insertion and extraction of lithium as a secondary battery type. However, the battery of the present application is not limited thereto. The present application is able to be similarly applied to a secondary battery in which the anode capacity includes the capacity associated with insertion and extraction of lithium and the capacity associated with precipitation and dissolution of lithium, and the anode capacity is expressed by the sum of these capacities, by using a material capable of inserting and extracting lithium as an anode active material and by setting the chargeable capacity in the anode material capable of inserting and extracting lithium to a smaller value than that of the discharge capacity of the cathode.

Further, in the foregoing embodiments and the foregoing examples, the description has been given with the specific examples of the cylindrical or laminated film secondary battery as a battery structure, and with the specific example in which the battery element has the spirally wound structure as a battery structure. However, the secondary battery of the present application is able to be similarly applied to a battery having other battery structure such as a square battery, a coin type battery, and a button type battery or a battery in which the battery element has other structure such as a lamination structure.

Further, in the foregoing embodiment and the foregoing examples, the description has been given of the case using lithium as an electrode reactant. However, as an electrode reactant, other Group 1 element such as sodium (Na) and potassium (K), a Group 2 element such as magnesium (Mg) and calcium (Ca), or other light metal such as aluminum may be used. In this case, the anode material described in the foregoing embodiment is able to be used as an anode active material as well.

Furthermore, in the foregoing embodiments and the foregoing examples, for the content of the organic acid shown in Chemical formula 1 in the secondary battery of the application, the appropriate range derived from the results of the examples has been described. However, such a description does not totally eliminate the possibility that the content may be out of the foregoing range. That is, the foregoing appropriate range is the range particularly preferable for obtaining the effects of the present application. Therefore, as long as effect of the application is obtained, the content may be out of the foregoing range in some degrees.

It should be understood by those skilled in the art that various modifications, combinations, sub-combinations and alternations may occur depending on design requirements and other factors insofar as they are within the scope of the appended claims or the equivalents thereof.

The invention claimed is:

1. A secondary battery comprising:
a cathode;
an anode; and
an electrolytic solution,
wherein the anode has an anode active material layer containing a plurality of anode active material particles having silicon,
the anode active material layer contains at least one of an oxide-containing film covering a surface of the anode active material particles and a metal material not being alloyed with an electrode reactant provided in gaps between the anode active material particles in the anode active material layer, the metal material including at least one of iron, cobalt, nickel, zinc, and copper, and
the electrolytic solution contains a solvent containing at least one of organic acids shown in Chemical formula 1:

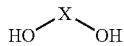

Chemical formula 1 where X is —(O═)C—(C(R1)$_2$)$_a$—C(═O)—, —(R2)$_2$C—(C(R1)$_2$)$_b$—C(═O)—, —(O═)$_2$S—(C(R3)$_2$)$_c$—S(═O)$_2$—, —(R4)$_2$C—(C(R3)$_2$)$_d$—S(═O)$_2$—, or —(O═)C—(C(R5)$_2$)$_e$—S(═O)$_2$—; R1 to R5 are a hydrogen group, an alkyl group, an aryl group, a halogen group, an alkyl halide group, or an aryl halide group; and a to e are one of integer numbers 0 to 4,
wherein the oxide-containing film contains an oxide of at least one selected from the group consisting of silicon, germanium, and tin.

2. The secondary battery according to claim 1, wherein the anode active material particles are at least one selected from the group consisting of a simple substance, an alloy, and a compound of silicon.

3. The secondary battery according to claim 1, wherein the halogen group, the alkyl halide group, or the aryl halide group in the Chemical formula 1 is a fluorine group, a fluorinated alkyl group, or a fluorinated aryl group.

4. The secondary battery according to claim 1, wherein a to e in the Chemical formula 1 are 0.

5. The secondary battery according to claim 1, wherein the oxide-containing film contains a fluorine anion, or a compound of fluorine.

6. The secondary battery according to claim 1, wherein the oxide-containing film is formed by liquid-phase deposition method.

7. The secondary battery according to claim 1, wherein the oxide-containing film is formed by at least one of liquid-phase precipitation method, solgel method, and dip coating method.

8. The secondary battery according to claim 1, wherein the metal material is provided in gaps between the anode active material particles.

9. The secondary battery according to claim 1, wherein the anode active material particles have a multilayer structure in the particles, and the metal material is provided in gaps between the anode active material particles.

10. The secondary battery according to claim 1, wherein the metal material is formed by liquid-phase deposition method.

11. The secondary battery according to claim 1, wherein the metal material is formed by electrolytic plating method or electroless plating method.

12. The secondary battery according to claim 1, wherein a content of the organic acid shown in the Chemical formula 1 in the solvent is in the range from 0.01 wt % to 3 wt %, both inclusive.

13. The secondary battery according to claim 1,
wherein the solvent contains at least one of a chain ester carbonate having halogen shown in Chemical formula 2, a cyclic ester carbonate having halogen shown in Chemical formula 3, a cyclic ester carbonate having an unsaturated bond shown in Chemical formula 4 to Chemical formula 6, sultone, and an acid anhydride:

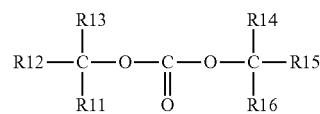

Chemical formula 2 where R11 to R16 are a hydrogen group, a halogen group, an alkyl group, or an alkyl halide group; and at least one of R11 to R16 is the halogen group or the alkyl halide group;

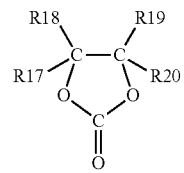

Chemical formula 3 where R17 to R20 are a hydrogen group, a halogen group, an alkyl group, or an alkyl halide group; and at least one of R17 to R20 is the halogen group or the alkyl halide group;

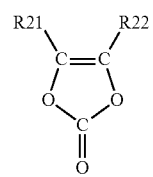

Chemical formula 4 where R21 and R22 are a hydrogen group or an alkyl group;

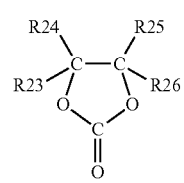

Chemical formula 5 where R23 to R26 are a hydrogen group, an alkyl group, a vinyl group, or an aryl group; and at least one of R23 to R26 is the vinyl group or the aryl group;

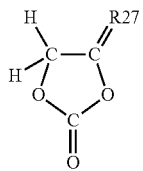

Chemical formula 6 where R27 is an alkylene group.

14. The secondary battery according to claim 13,
wherein the chain ester carbonate having halogen shown in the Chemical formula 2 is fluoromethyl methyl carbonate, difluoromethyl methyl carbonate, or bis(fluoromethyl) carbonate, and the cyclic ester carbonate having halogen shown in the Chemical formula 3 is 4-fluoro-1,3-dioxolane-2-one or 4,5-difluoro-1,3-dioxolane-2-one, and the cyclic ester carbonate having an unsaturated bond shown in the Chemical formula 4 is vinylene carbonate, the cyclic ester carbonate having an unsaturated bond shown in the Chemical formula 5 is vinylethylene carbonate, and the cyclic ester carbonate having an unsaturated bond shown in the Chemical formula 6 is methylene ethylene carbonate.

15. The secondary battery according to claim 1,
wherein the electrolytic solution contains an electrolyte salt containing at least one selected from the group consisting of lithium hexafluorophosphate ($LiPF_6$), lithium tetrafluoroborate ($LiBF_4$), lithium perchlorate ($LiClO_4$), lithium hexafluoroarsenate ($LiAsF_6$), compounds shown in Chemical formula 7 to Chemical formula 9, and compounds shown in Chemical formula 10 to Chemical formula 12:

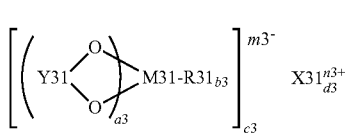

Chemical formula 7 where X31 is a Group 1 element or a Group 2 element in the periodic table or aluminum (Al); M31 is a transition metal element, a Group 13 element, a Group 14 element, or a Group 15 element in the long period periodic table; R31 is a halogen group; Y31 is $-(O=)C-R32-C(=O)-$, $-(O=)C-C(R33)_2-$, or $-(O=)C-C(=O)-$; R32 is an alkylene group, an alkylene halide group, an arylene group, or an arylene halide group; R33 is an alkyl group, an alkyl halide group, an aryl group, or an aryl halide group; a3 is one of integer numbers 1 to 4; b3 is 0, 2, or 4; and c3, d3, m3, and n3 are one of integer numbers 1 to 3;

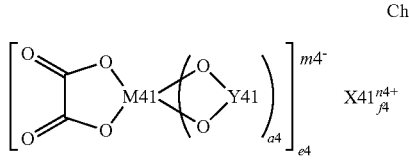

Chemical formula 8 where X41 is a Group 1 element or a Group 2 element in the long period periodic table; M41 is a transition metal element, a Group 13 element, a Group 14 element, or a Group 15 element in the long period periodic table; Y41 is $-(O=)C-(C(R41)_2)_{b4}-C(=O)-$, $-(R43)_2C-(C(R42)_2)_{c4}-C(=O)-$, $-(R43)_2C-(C(R42)_2)_{c4}-C(R43)_2-$, $-(R43)_2C-(C(R42)_2)_{c4}-S(=O)_2-$, $-(O=)_2S-(C(R42)_2)_{d4}-S(=O)_2-$, or $-(O=)C-(C(R42)_2)_{d4}-S(=O)_2-$; R41 and R43 are a hydrogen group, an alkyl group, a halogen group, or an alkyl halide group; at least one of R41/R43 is respectively the halogen group or the alkyl halide group; R42 is a hydrogen group, an alkyl group, a halogen group, or an alkyl halide group; a4, e4, and n4 are 1 or 2; b4 and d4 are one of integer numbers 1 to 4; c4 is one of integer numbers 0 to 4; and f4 and m4 are one of integer numbers 1 to 3;

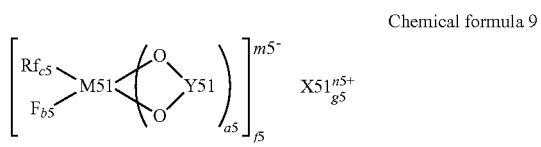

Chemical formula 9 where X51 is a Group 1 element or a Group 2 element in the long period periodic table; M51 is a transition metal element, a Group 13 element, a Group 14 element, or a Group 15 element in the long period periodic table; Rf is a fluorinated alkyl group with the carbon number in the range from 1 to 10, both inclusive, or a fluorinated aryl group with the carbon number in the range from 1 to 10, both inclusive; Y51 is $-(O=)C-(C(R51)_2)_d5-C(=O)-$, $-(R52)_2C-(C(R51)_2)_{d5}-C(=O)-$, $-(R52)_2C-(C(R51)_2)_{d5}-C(R52)_2-$, $-(R52)_2C-(C(R51)_2)_{d5}-S-(=O)_2-$, $-(O=)_2S-(C(R51)_2)_{e5}-S-(=O)_2-$, or $-(O=)C-(C(R51)_2)_{e5}-S(=O)_2-$; R51 is a hydrogen group, an alkyl group, a halogen group, or an alkyl halide group; R52 is a hydrogen group, an alkyl group, a halogen group, or an alkyl halide group, and at least one thereof is the halogen group or the alkyl halide group; a5, f5, and n5 are 1 or 2; b5, c5, and e5 are one of integer numbers 1 to 4; d5 is one of integer numbers 0 to 4; and g5 and m5 are one of integer numbers 1 to 3;

Chemical formula 10 where m and n are an integer number of 1 or more;

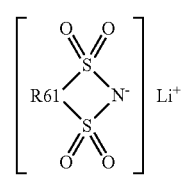

Chemical formula 11 where R61 is a straight chain/branched perfluoro alkylene group with the carbon number in the range from 2 to 4, both inclusive;

Chemical formula 14

(1)
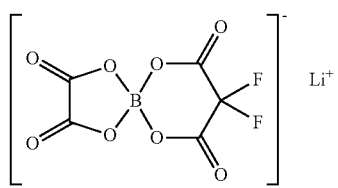

(2)
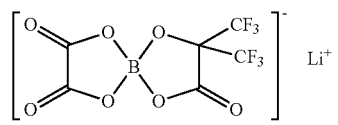

(3)
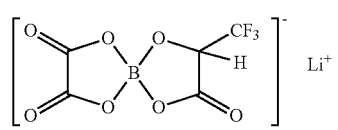

(4)
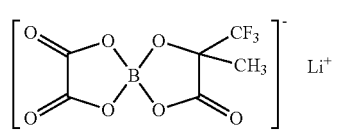

(5)
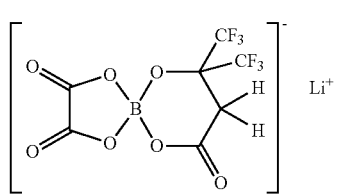

(6)
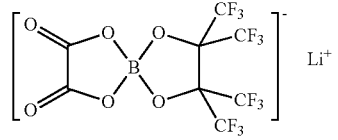

(7)
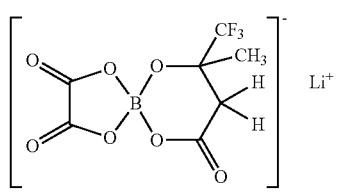

(8)
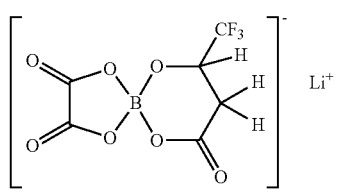

Chemical formula 15

(1)
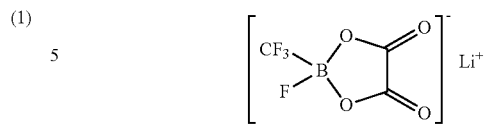

$\text{LiC}(C_pF_{2p+1}SO_2)(C_qF_{2q+1}SO_2)(C_rF_{2r+1}SO_2)$  Chemical formula 12 where p, q, and r are an integer number of 1 or more.

16. The secondary battery according to claim 15, wherein the compound shown in the Chemical formula 7 is a compound shown in Chemical formulas 13(1) to 13(6), the compound shown in the Chemical formula 8 is a compound shown in Chemical formulas 14(1) to 14(8), and the compound shown in the Chemical formula 9 is a compound shown in Chemical formula 15:

Chemical formula 13

(1)
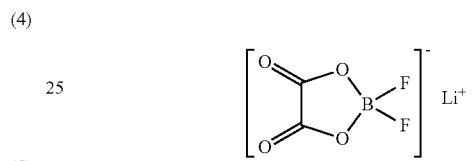

(2)
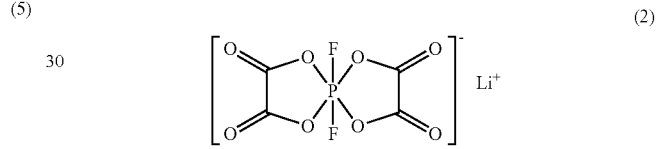

(3)
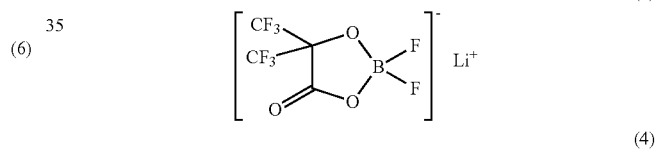

(4)
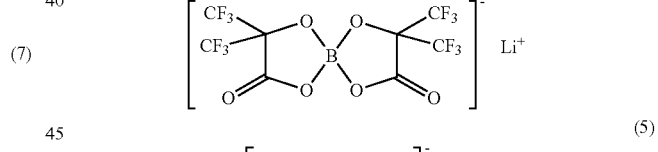

(5)
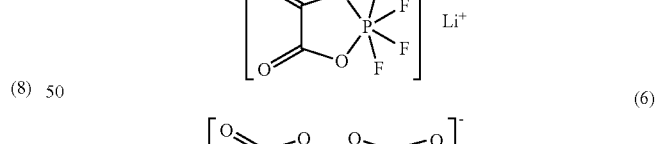

(6)
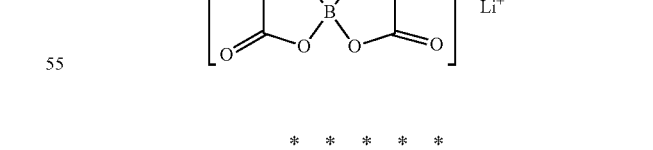

* * * * *